United States Patent
Hirata et al.

(10) Patent No.: US 8,082,906 B2
(45) Date of Patent: Dec. 27, 2011

(54) AIR DUCT FOR ENGINE

(75) Inventors: Ryu Hirata, Chiryu (JP); Yoshinobu Nagasaka, Kariya (JP); Hirotsugu Kojima, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 407 days.

(21) Appl. No.: 12/328,997

(22) Filed: Dec. 5, 2008

(65) Prior Publication Data

US 2010/0089368 A1    Apr. 15, 2010

(30) Foreign Application Priority Data

Dec. 7, 2007   (JP) ................................ 2007-317235
Dec. 7, 2007   (JP) ................................ 2007-317236
Dec. 17, 2007  (JP) ................................ 2007-325053

(51) Int. Cl.
  *F02M 33/00*   (2006.01)
  *F02M 29/00*   (2006.01)

(52) U.S. Cl. ................... 123/518; 123/590; 123/184.21; 123/198 E

(58) Field of Classification Search ................... 123/518, 123/522–524, 593, 198 E, 184.21, 184.56, 123/590, 592; 96/134, 154
See application file for complete search history.

(56) References Cited

U.S. PATENT DOCUMENTS

| | | | |
|---|---|---|---|
| 5,572,979 A * | 11/1996 | Czadzeck | 123/568.17 |
| 6,073,609 A * | 6/2000 | Buswell et al. | 123/306 |
| 6,170,460 B1 * | 1/2001 | Buswell et al. | 123/306 |
| 6,338,335 B1 * | 1/2002 | Patterson et al. | 123/590 |
| 6,440,200 B1 | 8/2002 | Sakakibara et al. | |
| 6,637,415 B2 * | 10/2003 | Yoshioka et al. | 123/518 |
| 6,692,555 B2 * | 2/2004 | Oda et al. | 96/134 |
| 6,698,403 B2 * | 3/2004 | Honda et al. | 123/520 |
| 7,168,417 B2 * | 1/2007 | Arruda et al. | 123/518 |
| 7,171,954 B2 | 2/2007 | Oda et al. | |
| 7,360,530 B2 * | 4/2008 | Oda et al. | 123/518 |
| 7,416,584 B2 * | 8/2008 | Hirata | 96/135 |
| 7,458,366 B2 * | 12/2008 | Luley et al. | 123/518 |
| 7,501,013 B2 * | 3/2009 | Oda | 96/154 |
| 7,520,271 B2 | 4/2009 | Saito | |
| 7,610,904 B2 * | 11/2009 | Treier et al. | 123/516 |

(Continued)

FOREIGN PATENT DOCUMENTS

JP         61-095970        6/1986

(Continued)

OTHER PUBLICATIONS

English language Abstract of JP 2006-348834, Dec. 28, 2006.

(Continued)

*Primary Examiner* — Hai Huynh
(74) *Attorney, Agent, or Firm* — Greenblum & Bernstein, P.L.C.

(57) ABSTRACT

An air duct 13 connected to the intake system of an engine 12 has a duct main body 13A and a cylindrical fuel adsorption filter 19 having air permeability. The fuel adsorption filter 19 is located in the duct main body 13A. The fuel adsorption filter 19 is arranged to be coaxial with respect to the duct main body 13A. A gap 21 is defined between the inner circumferential surface of the duct main body 13A and the outer circumferential surface of the fuel adsorption filter 19. An opening 22 for drawing air flow into the gap 21 is formed between an air flow upstream side of the gap 21 and an air passage area of the duct main body 13A.

20 Claims, 21 Drawing Sheets

U.S. PATENT DOCUMENTS

| | | |
|---|---|---|
| 7,758,678 B2 * | 7/2010 | Yoshida et al. .................. 96/135 |
| 2006/0283326 A1 | 12/2006 | Oda |
| 2006/0283426 A1 | 12/2006 | Oda et al. |
| 2007/0022880 A1 | 2/2007 | Mizutani et al. |
| 2007/0113740 A1 | 5/2007 | Oda |
| 2008/0216455 A1 | 9/2008 | Aizawa et al. |
| 2008/0257160 A1 | 10/2008 | Yoshida et al. |

FOREIGN PATENT DOCUMENTS

| | | |
|---|---|---|
| JP | 61-194761 | 12/1986 |
| JP | 2-105566 | 8/1990 |
| JP | 2000-110682 | 4/2000 |
| JP | 2001-336454 | 12/2001 |
| JP | 2002-004956 | 1/2002 |
| JP | 2002-106425 | 4/2002 |
| JP | 2003-028012 | 1/2003 |
| JP | 2005-240677 | 9/2005 |
| JP | 2006-226123 | 8/2006 |
| JP | 2006-329143 | 12/2006 |
| JP | 2006-348834 | 12/2006 |
| JP | 2007-291922 | 11/2007 |

OTHER PUBLICATIONS

English language Abstract of JP 2001-336454, Dec. 7, 2001.
English language Abstract of JP 2006-226123, Aug. 31, 2006.
Japan Office action that issued with respect to patent family member Japanese Patent Application No. 2007-317235, mail date is Jul. 26, 2011.
Japan Office action that issued with respect to patent family member Japanese Patent Application No. 2007-317236, mail date is Jul. 26, 2011.
Japan Office action that issued with respect to patent family member Japanese Patent Application No. 2007-325053, mail date is Jul. 26, 2011.

* cited by examiner

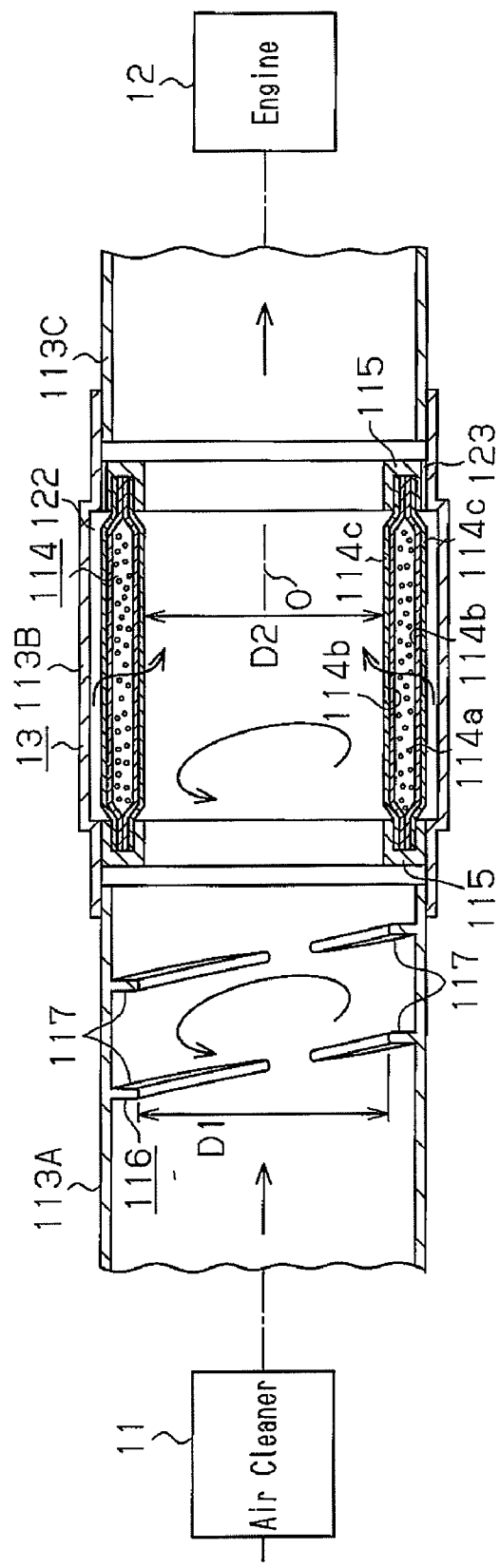

AIR DUCT FOR ENGINE

BACKGROUND OF THE INVENTION

The present invention relates to an air duct connected to the intake system of an engine, and more particularly, to an air duct that has a function to trap fuel vapor leaking from the engine intake system when the engine is not running.

Conventionally, for example, Japanese Laid-Open Patent Publication Nos. 2006-348834 (first prior art), 2001-336454 (second prior art), 2006-226123 (third prior art) each disclose such a fuel vapor trapping device.

The device of the first prior art includes an air cleaner and a filter element, which is arranged in the housing of the air cleaner so as to intersect an air passage. In the housing of the air cleaner, a fuel adsorbing member is located downstream in air flow of the filter element. Further, the fuel adsorbing member is arranged to intersect the air passage. The fuel adsorbing member includes a holder sheet and a cover sheet. The holder sheet includes a sheet base, which is made of nonwoven fabric and contains granular activated carbon. The cover sheet is made of nonwoven fabric and covers the holder sheet.

The device of the second prior art also includes an air cleaner and a filter element, which is arranged in the housing of the air cleaner so as to intersect an air passage. A plurality of reinforcing ribs are formed on the inner wall surface of the air cleaner, so as to be located downstream in the air flow from the filter element. Fuel adsorbent, which is formed by solidifying activated carbon powder with binder, is embedded between the reinforcing ribs.

Further, the device of the third prior art includes an air duct located between an air cleaner and an engine. Fuel adsorbent is provided on a part of the inner wall surface of the air duct. The fuel adsorbent is made of a woven fabric duct of activated carbon fibers.

The devices of these prior arts have the following drawbacks. That is, the device of the first prior art includes a fuel adsorbing member that is located in the housing of an air cleaner so as to intersect an air passage. Thus, the pressure loss of intake air flow is great while the engine is running, and the intake efficiency of the engine is lowered.

In contrast, in the devices of the second and third prior arts, fuel adsorbent is provided on the inner wall surface of the air cleaner housing or on the inner wall surface of the air duct. Therefore, unlike the device of the first prior art, the pressure loss of intake air flow is hardly increased. However, fuel adsorbent provided on the inner wall surface of an air cleaner housing or of an air duct has lower adsorbing and desorbing performances than a fuel adsorbing member arranged to intersect an air passage as in the device of the first prior art.

In other words, while the engine is running, intake air is likely to flow along an area about the center axis in the housing or in the air duct, and less likely to reach the fuel adsorbent on the inner wall surface in the housing or in the air duct. Therefore, fuel vapor that has already been adsorbed and trapped by the fuel adsorbent is hardly desorbed from the fuel adsorbent. As a result, the fuel adsorbent has a low fuel adsorbing performance.

SUMMARY OF THE INVENTION

Accordingly, it is an objective of the present invention to provide an air duct that reduces the pressure loss of intake air flow and improves the fuel vapor adsorbing and desorbing performances.

To achieve the foregoing objective and in accordance with a first aspect of the present invention, an air duct for an engine connected between an intake system of the engine and an air cleaner is provided. The air duct is hollow and has an inner circumferential surface. When the engine is operating, an air flow from the air cleaner toward the engine is generated in the air duct. The air duct includes a cylindrical fuel adsorption filter that has an outer circumferential surface and air permeability. The fuel adsorption filter arranged in the air duct to be coaxial with respect to an axis of the air duct, such that a gap is defined between the inner circumferential surface of the air duct and the outer circumferential surface of the fuel adsorption filter. An upstream communication passage for drawing some of the air flow into the gap is formed between an air flow upstream area of the gap and the air flow.

In accordance with a second aspect of the present invention, an air duct for an engine connected between an intake system of the engine and an air cleaner is provided. The air duct is a hollow cylinder having an axis. The air duct includes a sheet-like fuel adsorption filter located therein. The fuel adsorption filter is arranged on a plane that is parallel to the axis of the air duct, so as to form a chord in relation to the cylindrical shape of the air duct.

In accordance with a third aspect of the present invention, an air duct for an engine connected between an air cleaner and an intake system of the engine is provided. The air duct is a hollow cylinder having an inner circumferential surface. When the engine is operating, an air flow from the air cleaner toward the engine is generated in the air duct. The air duct includes a cylindrical fuel adsorption filter located on the inner circumferential surface of the air duct. The air duct includes a helical flow generating mechanism for causing the air flow to advance helically. The mechanism is located in the air duct at a position upstream of the fuel adsorption filter.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 23 is a cross-sectional view illustrating a modification of the thirteenth embodiment.

DETAILED DESCRIPTION OF THE PREFERRED EMBODIMENTS

Hereinafter, air ducts according to a first aspect of the present invention will be described.

First Embodiment

An air duct 13 according to a first embodiment will now be described with reference to FIGS. 1 and 2.

Figure 1:
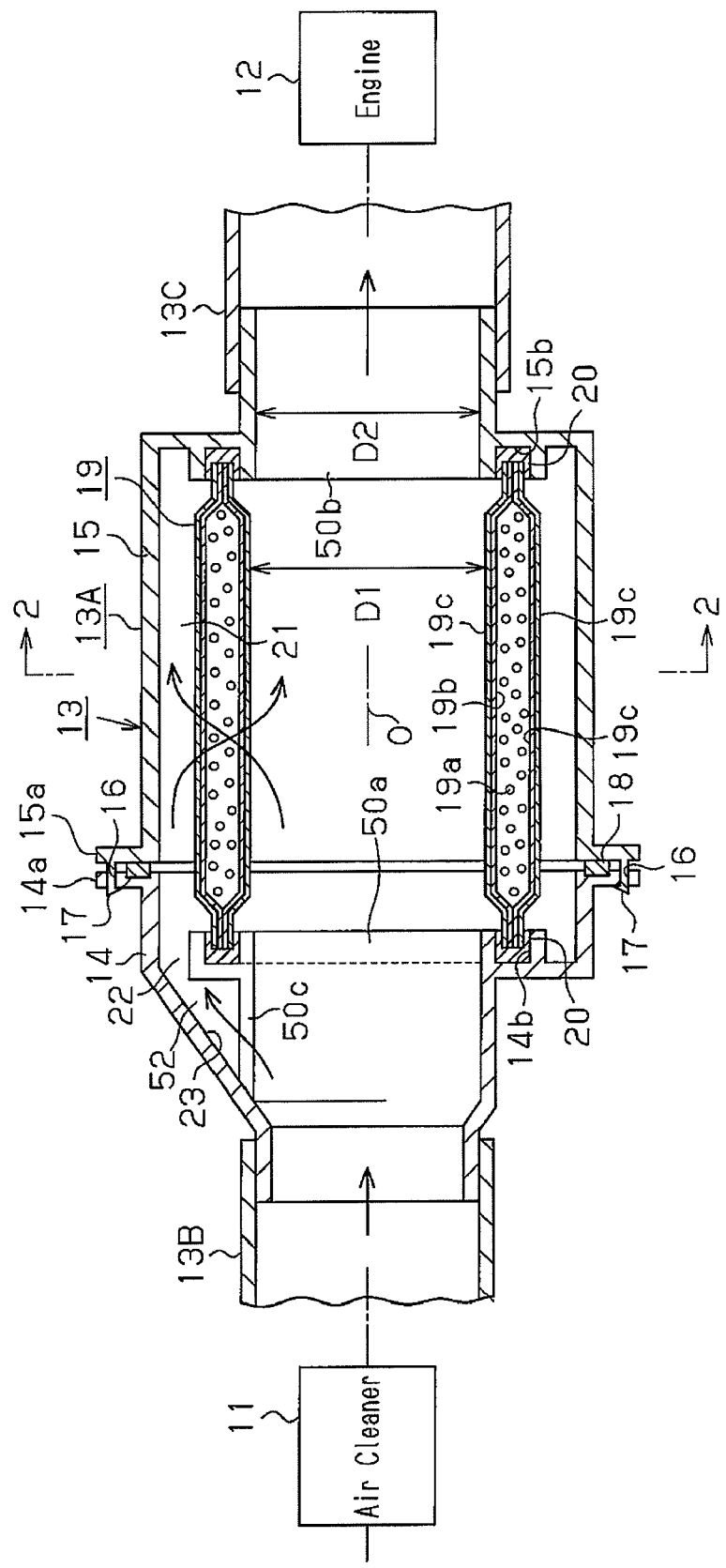
FIG. 1 is a cross-sectional view illustrating an air duct of an engine according to a first embodiment of the present invention.

As shown in FIG. 1, the air duct 13 is connected between an air cleaner 11 and an engine 12. The air duct 13 includes an intermediate duct main body 13A and coupler ducts 13B, 13C coupled to both sides of the duct main body 13A. While the engine 12 is running, air that has been filtered by the air cleaner 11 flows into an intake system of the engine 12 through the duct main body 13A and the coupler ducts 13B, 13C.

The duct main body 13A is formed by a cylindrical first segment 14 and a cylindrical second segment 15, which are divided along a direction perpendicular to the axis O. The segments 14, 15 have flanges 14a, 15a at the facing outer peripheral edges, respectively. A plurality of engagement holes 16 are formed in the flange 14a of the first segment 14. A plurality of snap-fit engagement projections 17, which are engageable with the engagement holes 16, are formed on the flange 15a of the second segment 15. The engagement projections 17 may be shaped like claws. With an annular sealing member 18 located between the flanges 14a, 15a, the engagement projections 17 are engaged with the engagement holes 16, so that the segments 14, 15 of the duct main body 13A are detachably coupled to each other.

A cylindrical portion 50a is formed inside the segment 14 of the duct main body 13A, and a cylindrical portion 50b is formed at an end of the segment 15 of the duct main body 13A. The cylindrical portions 50a, 50b of the segments 14, 15 have annular holding grooves 14b, 15b, respectively. A cylindrical fuel adsorption filter 19 of high air permeability is held between the holding grooves 14b, 15b of the segments 14, 15 in the duct main body 13A. The fuel adsorption filter 19 is arranged in the duct main body 13A to be coaxial with respect to the axis O of the duct main body 13A.

The cylindrical portion 50b of the segment 15 is connected to a coupler duct 13C and functions as a portion having an inner diameter D2. The inner diameter D2 is a diameter required as an air passage area of the duct main body 13A. The inner diameter D1 of the fuel adsorption filter 19 is greater than or equal to the inner diameter D2 of the cylindrical portion D2.

Figure 2:
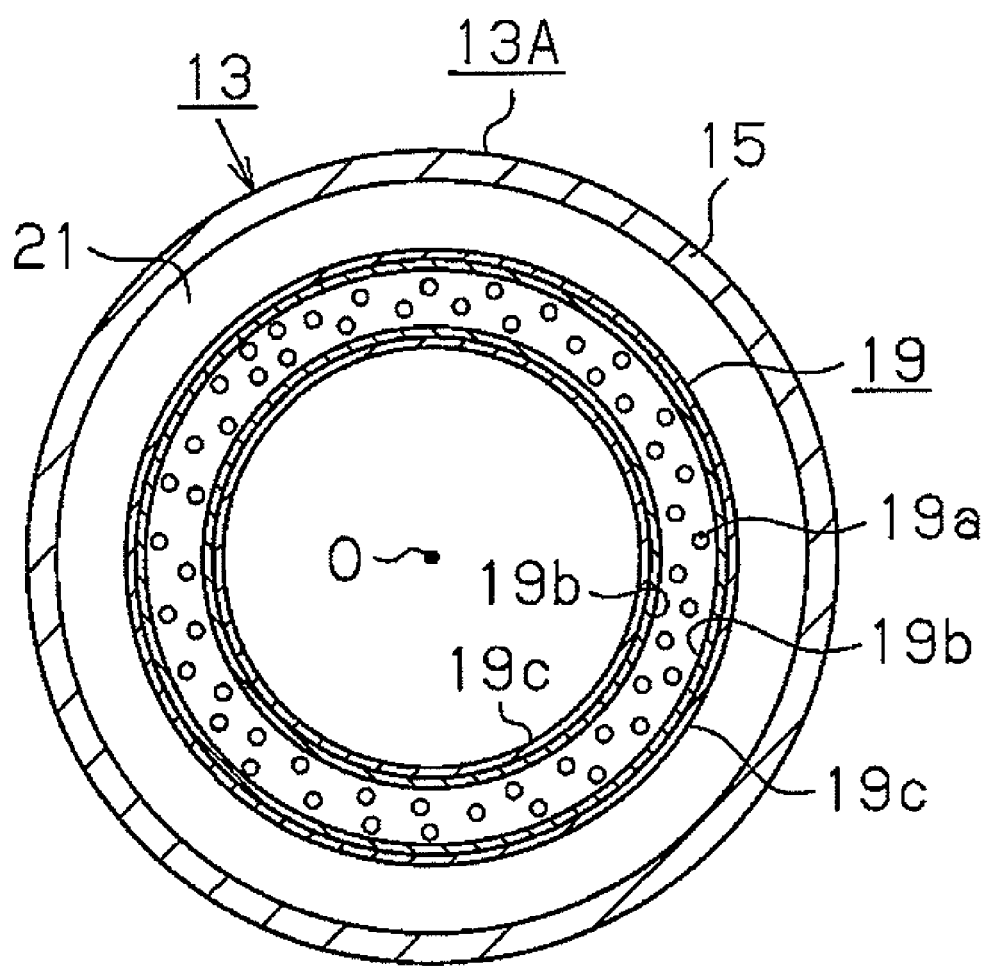
FIG. 2 is a cross-sectional view taken along line 2-2 of FIG. 1.

As shown in FIGS. 1 and 2, the fuel adsorption filter 19 includes a fuel adsorbent 19a, a pair of holding sheets 19b, and a pair of outer heat resistant nets 19c. The adsorbent 19a is granular activated carbon that adsorbs fuel vapor. The holding sheets 19b are made of nonwoven fabric and hold the adsorbent 19a substantially in an evenly dispersed manner. The heat resistant nets 19c cover and protect the holding sheets 19b from flames such as back fires and external forces. A hard resin annular frame 20 having a high rigidity is formed to cover peripheral edges of the holding sheets 19b and the heat resistant nets 19c. If fuel vapor leaks from the intake system of the engine 12 when the engine 12 is not running, the leaked fuel vapor is adsorbed and trapped by the adsorbent 19a of the fuel adsorption filter 19. In the drawings, the thickness of the fuel adsorption filter 19 is exaggerated. However, the filter 19 is thin in reality, and the thickness is 2 to 5 mm.

A gap 21 is defined between the inner circumferential surface of the duct main body 13A and the outer circumferential surface of the fuel adsorption filter 19. The gap 21 and the air passage area are defined by the cylindrical portion 50a of the first segment 14. At least one opening 22 for drawing air flow into the gap 21 is defined between an air flow upstream area of the gap 21 and an air passage portion in a center of the duct main body 13A. Also, an opening portion 50c, which corresponds to the opening 22, is formed in the cylindrical portion 50a of the first segment 14. In this manner, an upstream communication passage 52 for drawing part of air flow into the gap 21 is formed from the opening portion 50c to the opening 22. An inclined guiding portion 23 is formed on an inner wall surface of the first segment 14 of the duct main body 13A to correspond to the opening 22. The inclined guiding portion 23 guides air flow to the opening 22. While the engine 12 is running, the air flow through the air passage area in the duct main body 13A is drawn into the gap 21 from the inclined guiding portion 23 through the opening portion 50c, the upstream communication passage 52, and the opening 22.

The operation of the air duct 13 configured as described above will now be described.

When the engine 12 of the vehicle having the air duct 13 is started, air flows into the intake system of the engine 12 through the air cleaner 11 and the air duct 13. In this case, the fuel adsorption filter 19 is arranged in the duct main body 13A of the air duct 13 to be coaxial with respect to the duct main body 13A. The inner diameter D1 of the fuel adsorption filter 19 is greater than or equal to the inner diameter D2 of the cylindrical portion 50b, which is a diameter necessary for an air passage area of the duct main body 13A. Therefore, the fuel adsorption filter 19 hardly increases the pressure loss of the air flow.

After the engine 12 is stopped, fuel vapor that leaks from the intake system of the engine 12 is adsorbed and trapped by the adsorbent 19a of the fuel adsorption filter 19 arranged in the duct main body 13A. Thus, fuel vapor from the engine 12 is prevented from leaking to the atmosphere.

When the engine 12 is started again, air flow through the air passage area of the duct main body 13A passes through the fuel adsorption filter 19 from the inside to the outside, and is guided to the gap 21 between the inner circumferential surface of the duct main body 13A and the outer circumferential surface of the fuel adsorption filter 19. Simultaneously, the air flow through the air passage area in the duct main body 13A is drawn into the gap 21 through the opening 22 by the guiding effect of the inclined guiding portion 23. Thereafter, the air flow passes through the fuel adsorption filter 19 from the outside to the inside and is returned to the air passage area in the duct main body 13A. Therefore, fuel vapor that has been adsorbed and trapped by the adsorbent 19a of the fuel adsorption filter 19 is easily desorbed from the adsorbent 19a.

The air duct 13 according to the first embodiment provides the following advantages.

Fuel vapor that has been adsorbed by the fuel adsorption filter 19 is properly desorbed from the filter 19 by air flow during the operation of the engine. Since the desorbed fuel vapor is drawn into the engine, leakage of fuel vapor to the atmosphere is prevented.

Since fuel vapor that has been adsorbed by the fuel adsorption filter 19 is properly desorbed from the filter 19 as the engine operates, the fuel adsorbing performance of the fuel adsorption filter 19 is maintained to a satisfactory level. Also, fuel vapor that leaks from the intake system of the engine 12 during the stopped state of the engine 12 is effectively adsorbed and trapped by the fuel adsorption filter 19. Fuel vapor is thus prevented from leaking to the atmosphere.

The fuel adsorption filter 19 is arranged to be coaxial with respect to the axis O of the duct main body 13A. The inner diameter D1 of the fuel adsorption filter 19 is greater than or equal to the inner diameter D2, which is a diameter necessary for the cylindrical portion 50b of the duct main body 13A, or for an air passage area. The pressure loss of air flow in the duct main body 13A is thus reduced, and the intake efficiency of the engine is prevented from being lowered.

Second Embodiment

A second embodiment of the present invention will now be described. The differences from the first embodiment will mainly be discussed. Like or the same reference numerals are given to those components that are like or the same as the corresponding components and detailed explanations are omitted.

Figure 3:
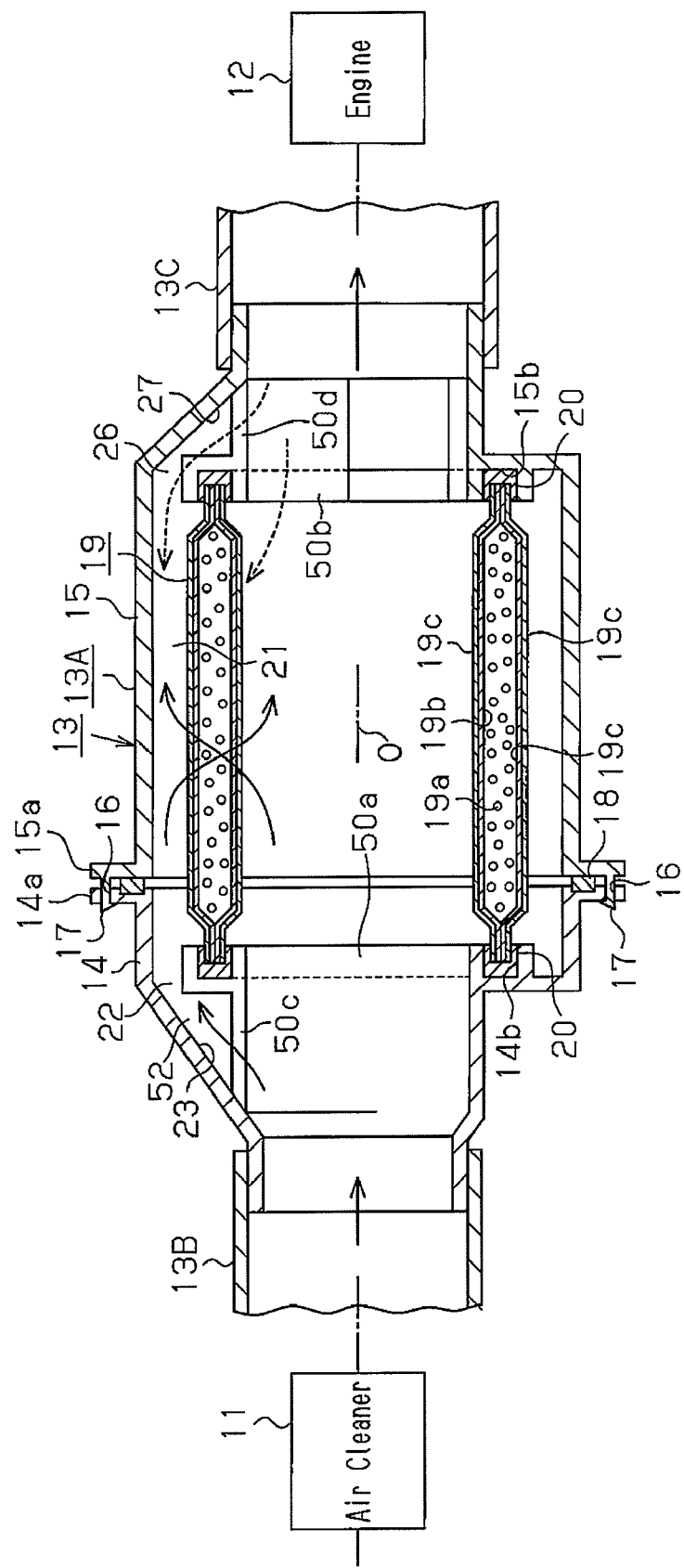
FIG. 3 is a cross-sectional view illustrating an air duct of an engine according to a second embodiment of the present invention.

In the second embodiment, a gap 21 is defined in an air flow upstream area in the gap 21 between the inner circumferential surface of the duct main body 13A and the outer circumferential surface of the fuel adsorption filter 19 as shown in FIG. 3. In addition, at least one opening 26 is formed in an air flow downstream area of the gap 21. Also, an inclined guiding portion 27 is formed on an inner surface of the second segment 15 that corresponds to the opening 26 of the duct main body 13A. The guiding portion 27 is continuous to the opening 26. Further, an opening portion 50d, which corresponds to the opening 26, is formed in the cylindrical portion 50b of the second segment 15. A downstream communication passage 53 is formed to extend from the opening portion 50d to the gap 21 via the opening 26.

Therefore, after the engine 12 is stopped, fuel vapor is adsorbed and trapped by the adsorbent 19a through the inner circumferential surface of the fuel adsorption filter 19. Simultaneously, fuel vapor flows into the gap 21 through the opening portion 50d on the air flow downstream side, the downstream communication passage 53, and the opening 26, and is adsorbed and trapped by the adsorbent 19a through the outer circumferential surface of the fuel adsorption filter 19. Thus, fuel vapor is adsorbed and trapped not only through the inner surface of the fuel adsorption filter 19, but also through the outer surface, which further improves the fuel vapor adsorption performance.

Further, while the engine 12 is running, air flow that has flowed into the gap 21 through the opening 22 on the air upstream side passes through the fuel adsorption filter 19 from the outside to the inside, and is returned to the air passage area in the center of the duct main body 13A. The air flow in the gap 21 passes along the outer circumferential surface of the fuel adsorption filter 19, and is returned to the air passage area in the duct main body 13A through the opening 26 on the air flow downstream side, the downstream communication passage 53, and the opening portion 50d. Further, the air flow through the center air passage in the duct main body 13A passes through the fuel adsorption filter 19 to the outside, and is returned to the center air passage area through the opening 26 on the air flow downstream side, the downstream communication passage 53, and the opening portion 50d. Accordingly, the air duct 13 of the second embodiment has the following advantage.

The amount of air flow that passes through the fuel adsorption filter 19 and the amount air flowing along the surface of the fuel adsorption filter 19 are increased. This further improves the fuel vapor desorbing performance of the fuel adsorption filter 19.

Third Embodiment

A third embodiment of the present invention will now be described. The differences from the first embodiment will mainly be discussed.

Figure 4:
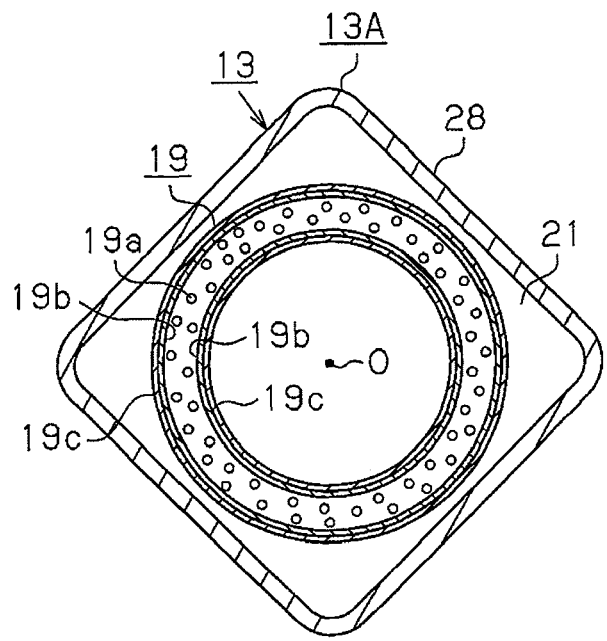
FIG. 4 is a cross-sectional view illustrating a duct main body of an air duct according to a third embodiment of the present invention.

In the third embodiment, a portion 28 of the duct main body 13A that corresponds to the fuel adsorption filter 19 has a rectangular cross section as shown in FIG. 4. A gap 21 is defined between the inner surface of the rectangular portion 28 and the outer circumferential surface of the fuel adsorption filter 19. Accordingly, the third embodiment has the following advantage.

The rectangular portion 28 of the duct main body 13A widens the gap 21 on the outer circumferential surface of the fuel adsorption filter 19 at the corners of the rectangular portion 28. This increases the amount of air that flows along the surface of the fuel adsorption filter 19 or passes through the filter 19. This further improves the fuel vapor desorption performance.

Fourth Embodiment

A fourth embodiment of the present invention will now be described. The differences from the first embodiment will mainly be discussed.

Figure 5:
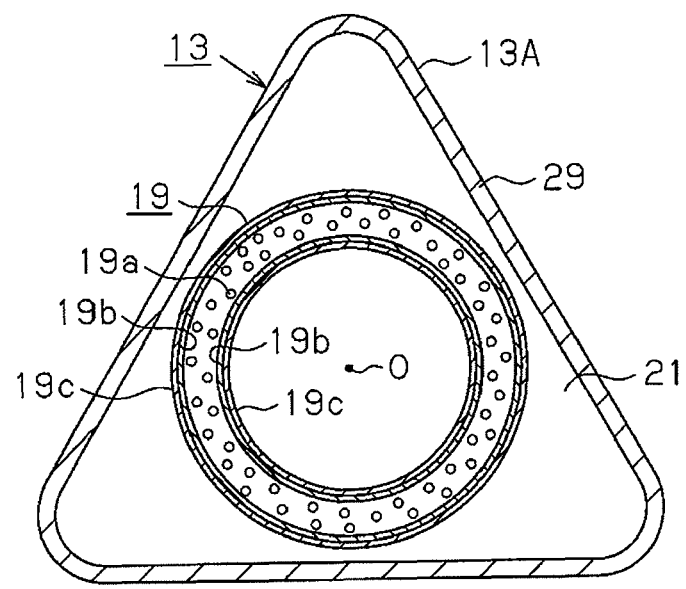
FIG. 5 is a cross-sectional view illustrating a duct main body of an air duct according to a fourth embodiment of the present invention.

In the fourth embodiment, a portion 29 of the duct main body 13A that corresponds to the fuel adsorption filter 19 has a triangular cross section as shown in FIG. 5. A gap 21 is defined between the inner surface of the triangular portion 29 and the outer circumferential surface of the fuel adsorption filter 19. Therefore, in the fourth embodiment, the gap 21 is widened at corners of the triangular portion 29 on the outer circumferential surface of the fuel adsorption filter 19. Thus, the air duct 13 of the fourth embodiment has substantially the same advantages as the third embodiment.

Fifth Embodiment

A fifth embodiment of the present invention will now be described. The differences from the first embodiment will mainly be discussed.

Figure 6:
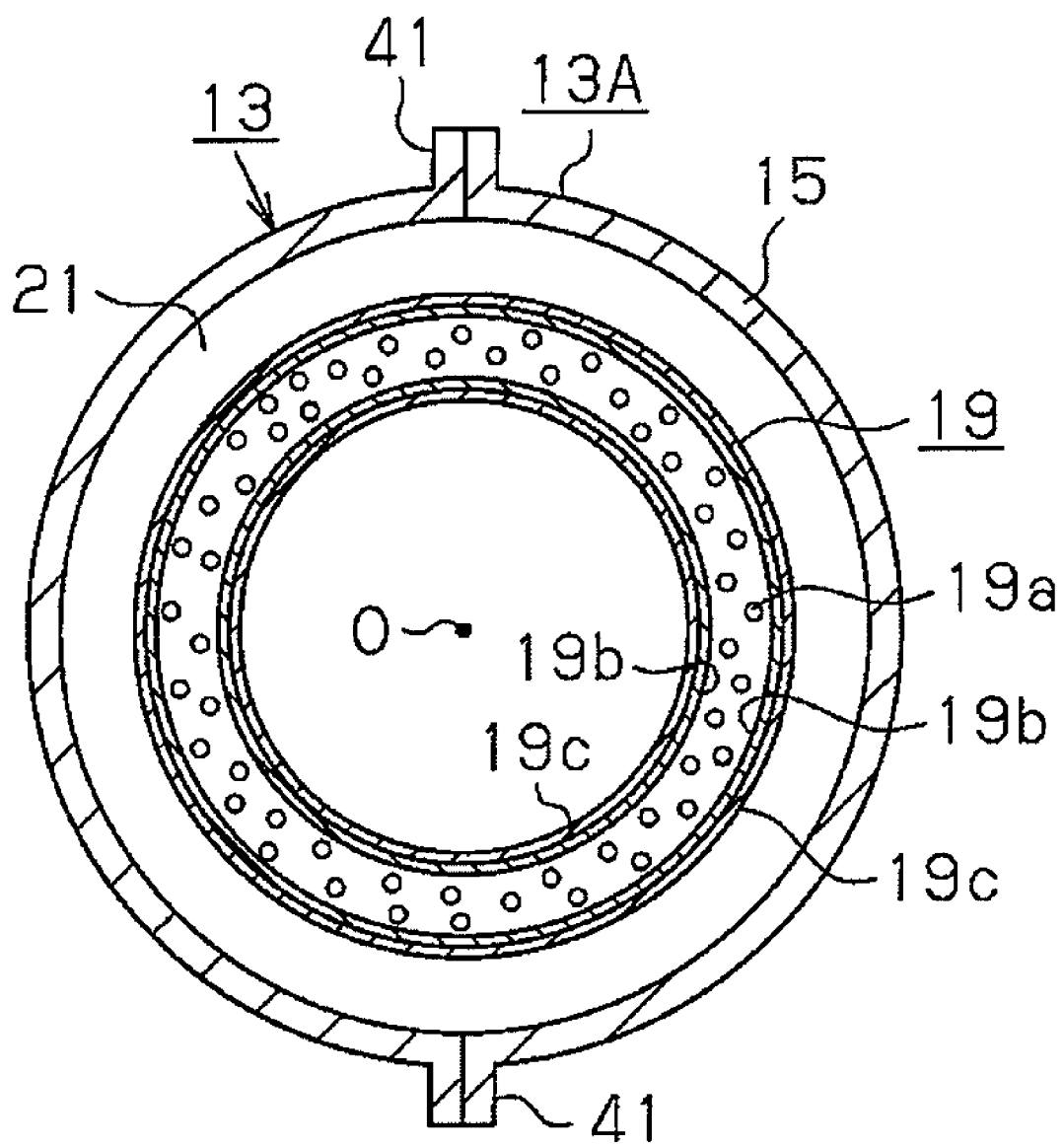
FIG. 6 is a cross-sectional view illustrating a duct main body of an air duct according to a sixth embodiment of the present invention.
Figure 7:
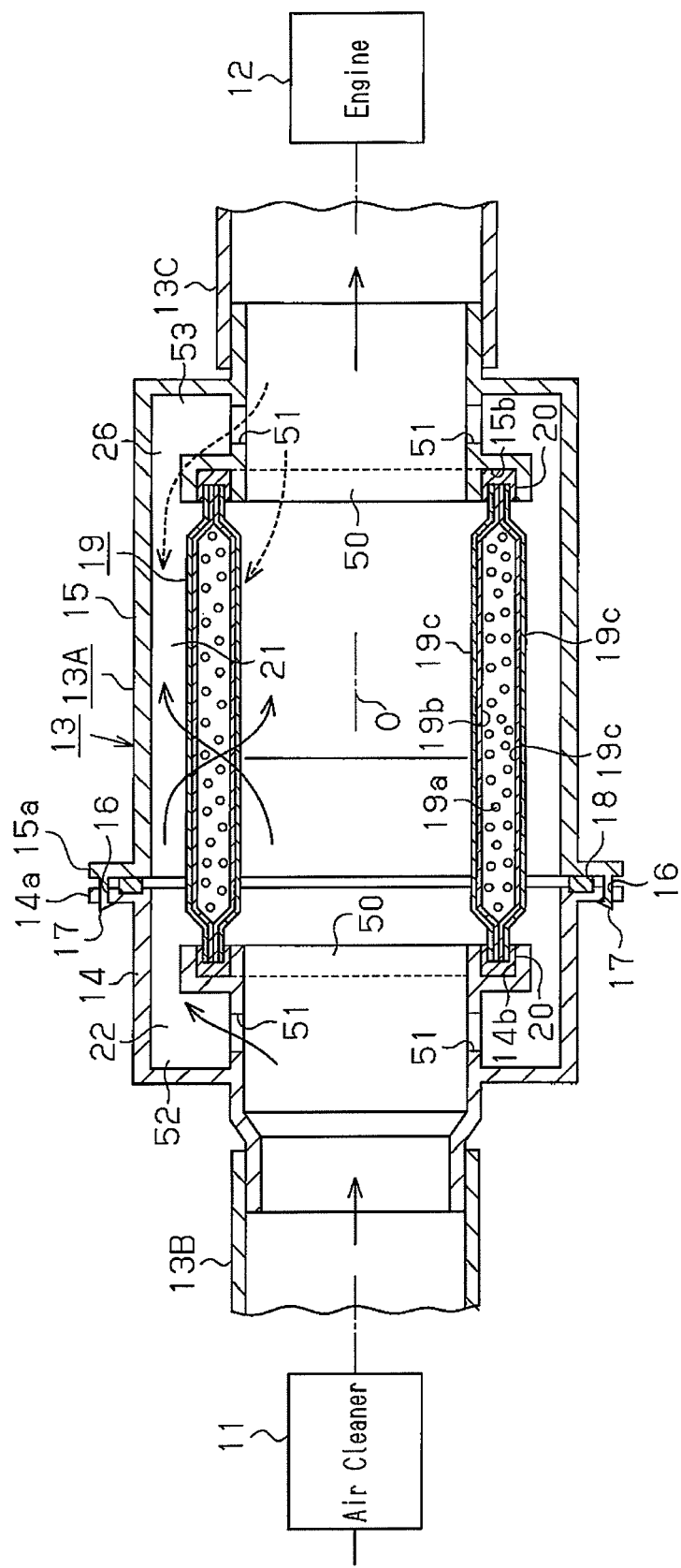
FIG. 7 is a cross-sectional view illustrating an air duct of an engine according to a sixth embodiment of the present invention.

In the fifth embodiment, the duct main body 13A is formed by segments 14, 15, which are divided along a plane passing through the axis O of the duct main body 13A as shown in FIG. 6. A flange 41 is formed at the ends of the segments 14, 15. The segments 14, 15 are bonded to each other by adhering the flanges 41.

The fifth embodiment thus provides the same advantages as the first embodiment.

Sixth Embodiment

A sixth embodiment of the present invention will now be described. The differences from the first embodiment will mainly be discussed.

In the sixth embodiment, the holding grooves 14b, 15b, which support the annular frames 20 at the ends of the fuel adsorption filter 19, are each formed in one of a pair of cylindrical portions 50, which are integrally formed with the duct main body 13A. Each cylindrical portion 50 has a plurality of through holes 51. Thus, part of air flowing through the center area of the duct main body 13A flows to the gap 21 through the through holes 51 on the upstream side. Also, air flowing through the gap 21 flows to the center area of the duct main body 13A through the through holes 51 on the downstream side. Some of fuel vapor flows through the downstream through holes 51 to be adsorbed and trapped at the outer circumferential surface of the fuel adsorption filter 19.

Thus, the sixth embodiment has substantially the same advantages as the second embodiment.

Hereinafter, air ducts according to a second aspect of the present invention will be described.

Since a air duct 13 according to the second aspect of the present invention is different from the above embodiments in the arrangement of fuel adsorption filters 19, the arrangement of fuel adsorption filters 19 will now be schematically described.

FIGS. 16(a) to 16(e) are diagrams of air ducts 13 as viewed from an end face. The air ducts 13 each have a fuel adsorption filter 19 arranged in a different manner. FIGS. 17(a) to 17(f) are cross-sectional diagrams along the axis O, showing the air ducts 13. As shown in FIGS. 16(a) to 16(e) and FIGS. 17(a) to 17(f), the air ducts 13 have a sheet-like fuel adsorption filter 19 located along the axis O of the air duct 13 at least at the position of a chord in the air duct 13.

Figure 16A:
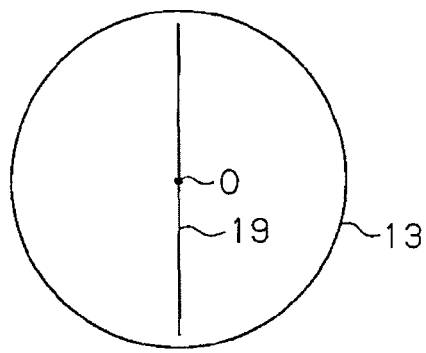
FIGS. 16(a) to 16(e) are diagrams of air ducts each having a different structure as viewed from an end face.
Figure 16B:
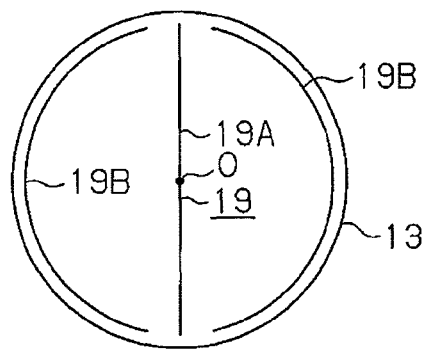
Figure 16C:
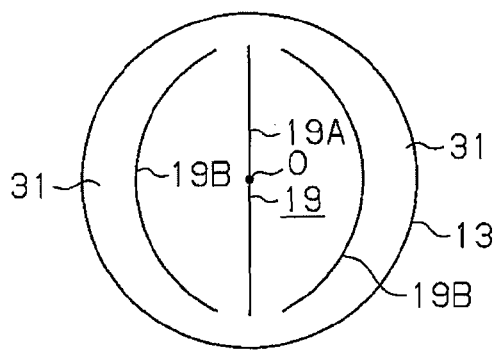
Figure 16D:
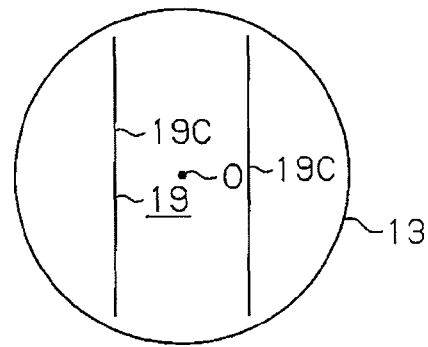
Figure 17A:
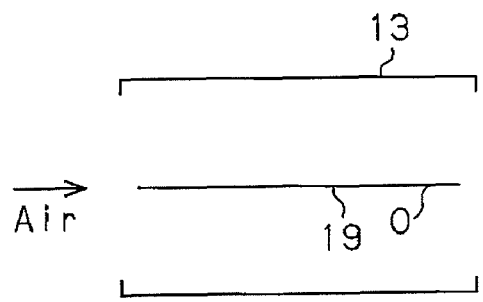
FIGS. 17(a) to 17(f) are schematic cross-sectional views showing air ducts each having a different structure.

For example, in the air duct shown in FIGS. 16(a) and 17(a), the fuel adsorption filter 19 is located at the position of a chord passing through the axis O of the air duct 13, or on a radius. In the air duct 13 shown in FIGS. 16(b) and 17(b), the fuel adsorption filter 19 is formed by a plurality of filter portions 19A, 19B. The first filter portion 19A is located on a radius, or at the position of a chord in the air duct 13, and the second filter portions 19B are arranged at positions of arcs along the inner surface of the air duct 13. In the air duct shown in FIGS. 16(c) and 17(c), second filter portions 19B are arranged such that a gap is defined between the air duct 13 and the filter portions 19B. In the air duct 13 shown in FIGS. 16(d) and 17(d), the fuel adsorption filter 19 is formed by a plurality of filter portions 19C, which are spaced from each other and arranged parallel to each other. The filter portions 19C are at the positions of chords spaced from the axis O of the air duct 13.

Figure 16E:
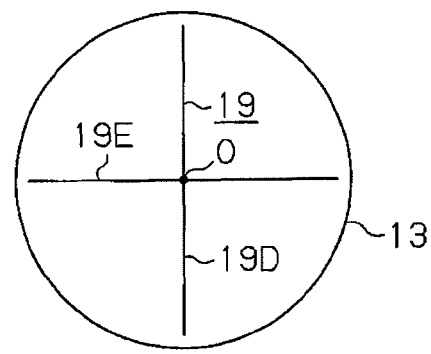

In the air duct 13 shown in FIG. 16(e), the air filter 19 includes two filter portions 19D, 19E, which are perpendicular to each other and extend radially. In the air duct 13 shown in FIG. 17(e), a filter portion 19F is located on a radius of the air duct 13 in the upstream half as in the case of FIGS. 16(a) and 17(a). In the downstream half, filter portions 19G are located along the inner wall surface of the air duct 13. In the air duct 13 shown in FIG. 17(f), a gap 31 is defined between the inner circumferential surface of the air duct 13 and each filter portion 19G. In the air duct 13 shown in FIGS. 17(e) and 17(f), the filter portion 19F on a radius may be located in the downstream side, and the filter portions 19G on the inner circumferential surface may be located in the upstream side. Further, the upstream filter portion and the downstream filter portion may overlap as in a region L shown in FIGS. 17(e) and 17(f).

In any of the air ducts 13 shown in FIGS. 16(a) to 16(e) and FIGS. 17(a) to 17(f), the position of the fuel adsorption filter 19 may be shifted leftward, rightward, upward, or downward as necessary. For example, although the fuel adsorption filter 19 extends along a vertical radius in FIG. 16(a), the filter 19 may be rotated ninety degrees, so that it extends horizontally. The cross-sectional shape of het air duct 13 is not limited to cylindrical, but may be rectangular or hexagonal.

Seventh Embodiment

The air duct 13 that corresponds to FIGS. 16(a) and 17(a) will now be described with reference to FIGS. 8 to 10. The differences from the above embodiments will be explained.

Figure 8:
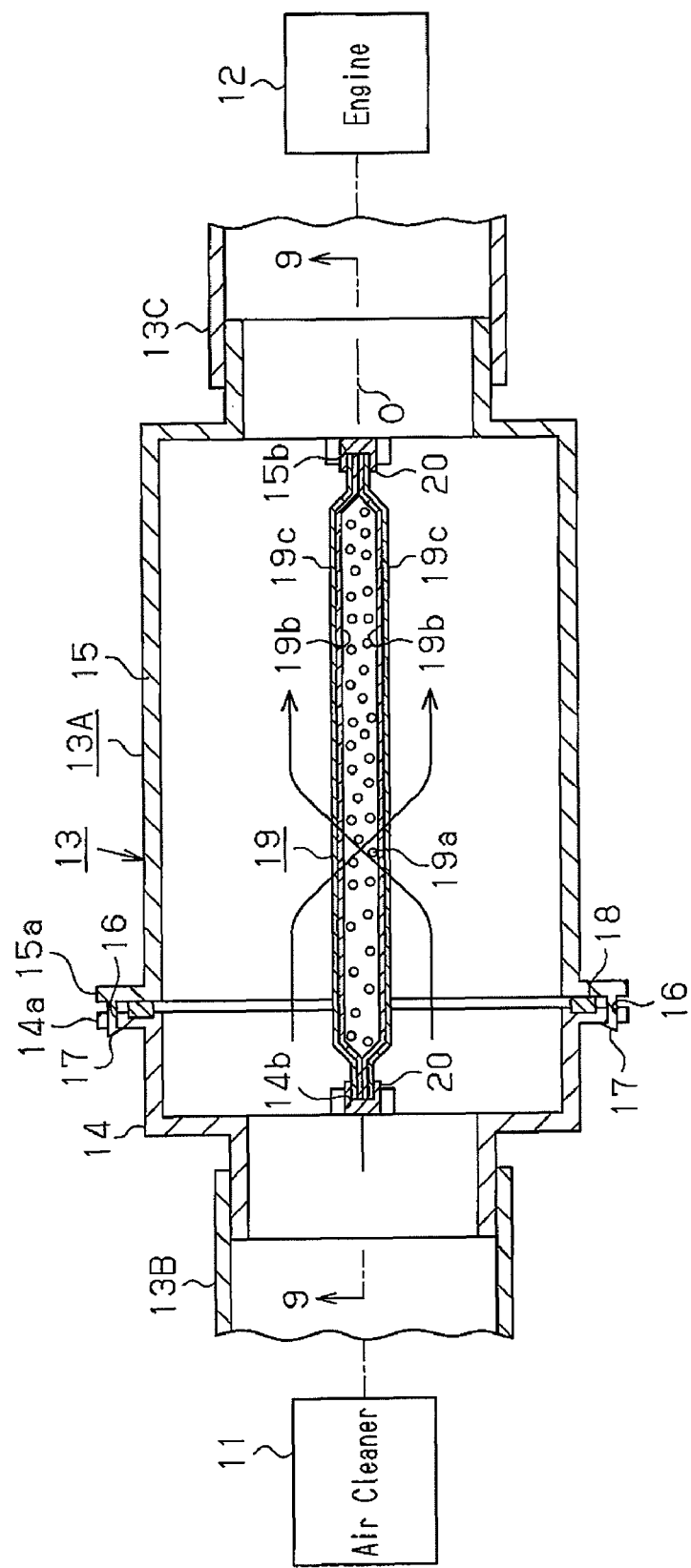
FIG. 8 is a cross-sectional view illustrating an air duct of an engine according to a seventh embodiment of the present invention.
Figure 9:
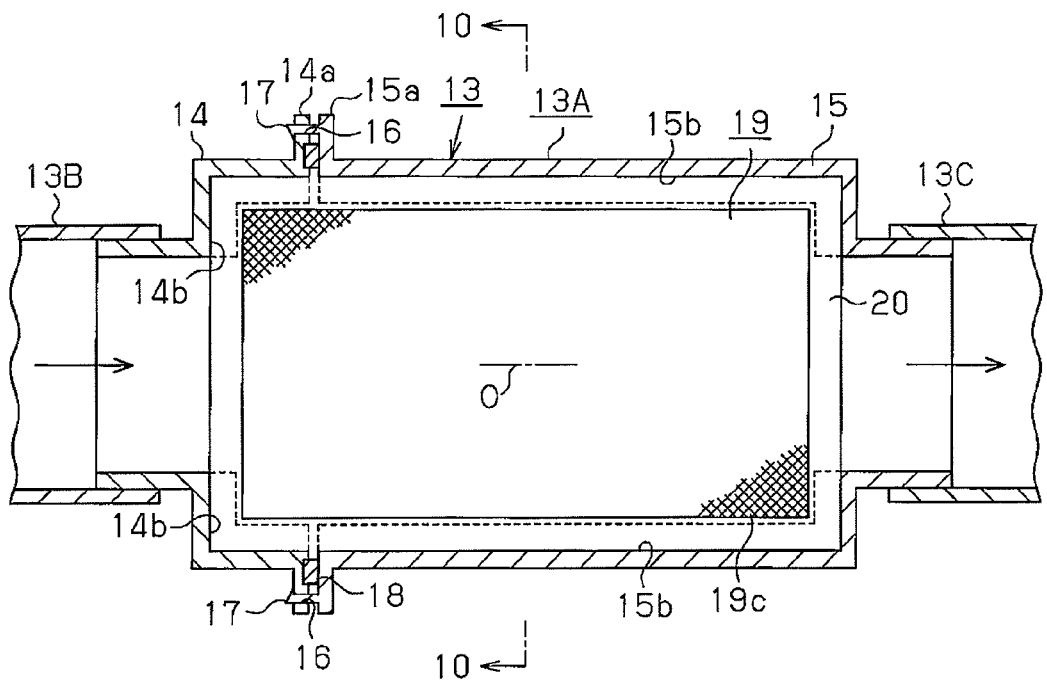
FIG. 9 is a cross-sectional view taken along line 9-9 of FIG. 8.
Figure 10:
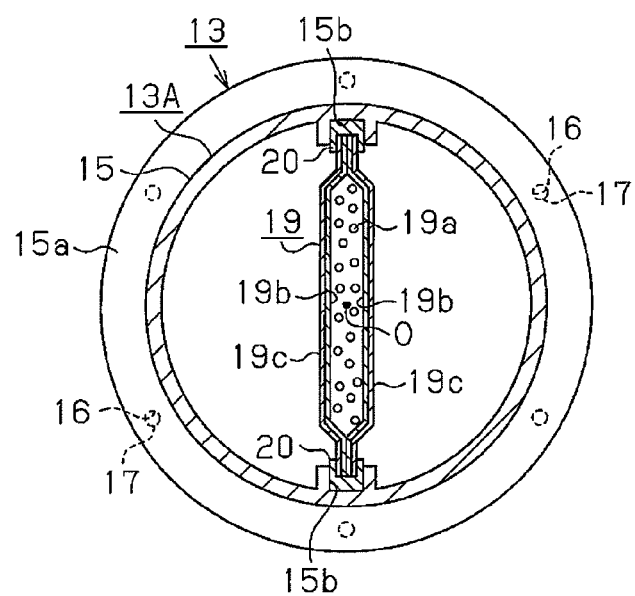
FIG. 10 is a cross-sectional view taken along line 10-10 of FIG. 9.

As shown in FIGS. 8 and 9, a pair of holding grooves 14b, which are spaced by 180 degrees, are formed on an inner circumferential surface and an inner wall surface of the first segment 14 of the duct main body 13A. A pair of holding grooves 15b, which face each other, are formed on the inner circumferential surface and the inner wall surface of the second segment 15, so as to correspond to the holding grooves 14b of the first segment 14. A sheet-like fuel adsorption filter 19 having air permeability is held between the holding grooves 14b, 15b of the segments 14, 15. The fuel adsorption filter 19 is arranged in a plane that passes through the axis O of the duct main body 13A. The upstream end and the downstream end of the fuel adsorption filter 19 are both located in the openings at the ends of the duct main body 13A, respectively.

The operation and the advantages of the air duct according to the seventh embodiment will now be described.

When the engine 12 is started, air flows into the intake system of the engine 12 through the air cleaner 11 and the air duct 13. In this case, the fuel adsorption filter 19 is arranged in a plane passing through the axis O at the position of a chord in the duct main body 13A of the air duct 13 without intersecting the air flow. Therefore, the fuel adsorption filter 19 arranged in the duct main body 13A hardly increases the pressure loss of the air flow.

After the engine 12 is stopped and fuel vapor leaks from the intake system of the engine 12 to the air duct 13, the fuel vapor is adsorbed and trapped by the adsorbent 19a of the fuel adsorption filter 19 arranged in the duct main body 13A. In this case, since the sheet-like fuel adsorption filter 19 is located at the position of a chord in the duct main body 13A, the fuel vapor does not concentrate on one side of the fuel adsorption filter 19, but evenly contacts both sides. Fuel vapor is thus efficiently adsorbed and trapped by the adsorbent 19a on both sides of the fuel adsorption filter 19, and is prevented from leaking to the atmosphere.

When the engine 12 is started again, air flows along both sides of the fuel adsorption filter 19, and some of the air flow passes through the fuel adsorption filter 19, and freely moves back and forth between both sides of the filter 19. That is, since the fuel adsorption filter 19 is located at the position of a chord of the duct main body 13A, some of the air flow freely passes through the fuel adsorption filter 19 from one side to the other and vice versa. Therefore, fuel vapor that has been adsorbed and trapped by the adsorbent 19a of the fuel adsorption filter 19 is easily desorbed from the adsorbent 19a.

The seventh embodiment thus provides the same advantages as the first embodiment.

Particularly, since the fuel adsorption filter 19 is placed on and parallel to a plane passing through the axis of the duct main body 13A, the pressure loss in the duct main body 13A is reduced. This prevents the intake efficiency of the engine 12 from being lowered.

Eighth Embodiment

Figure 17B:
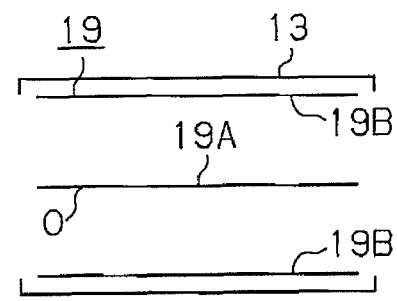

An eighth embodiment of the present invention, which corresponds to FIGS. 16(b) and 17(b), will now be described. The differences from the seventh embodiment will mainly be discussed.

Figure 11:
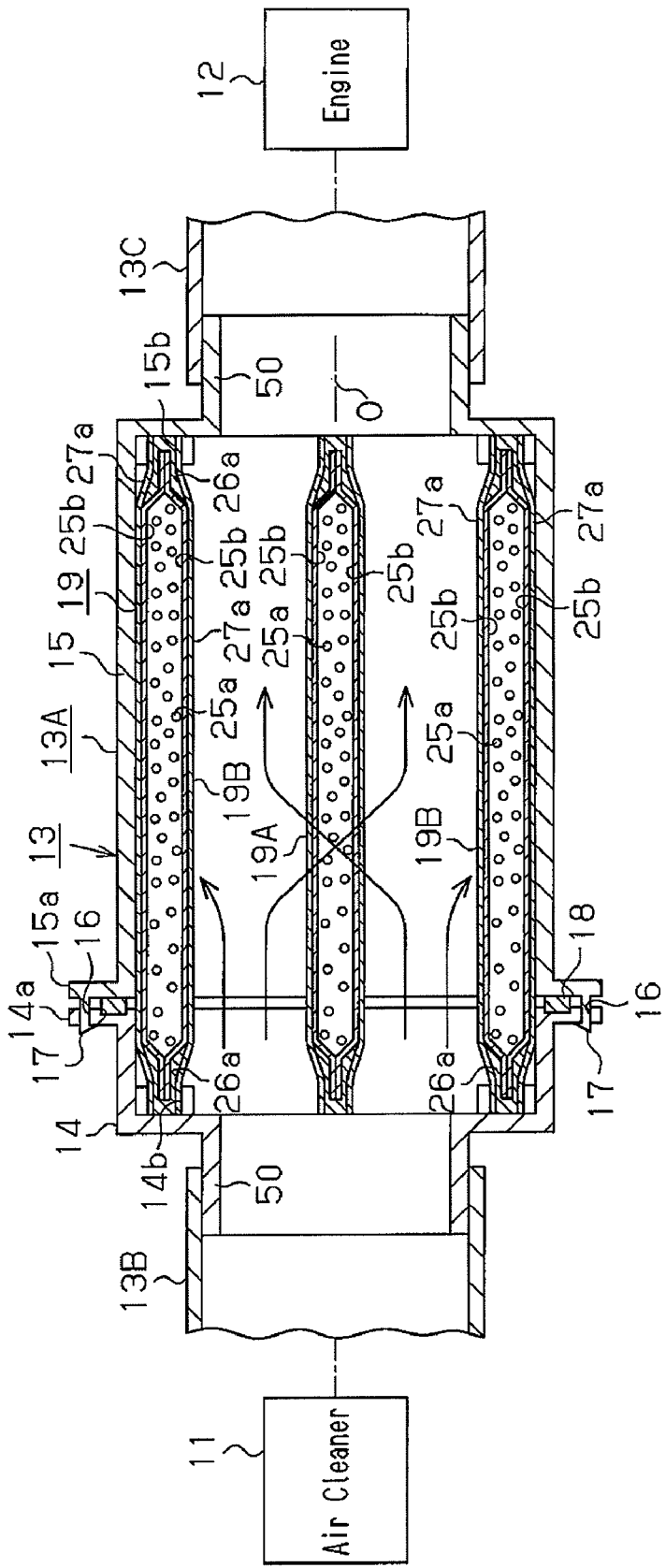
FIG. 11 is a cross-sectional view illustrating an air duct of an engine according to an eighth embodiment of the present invention.
Figure 12:
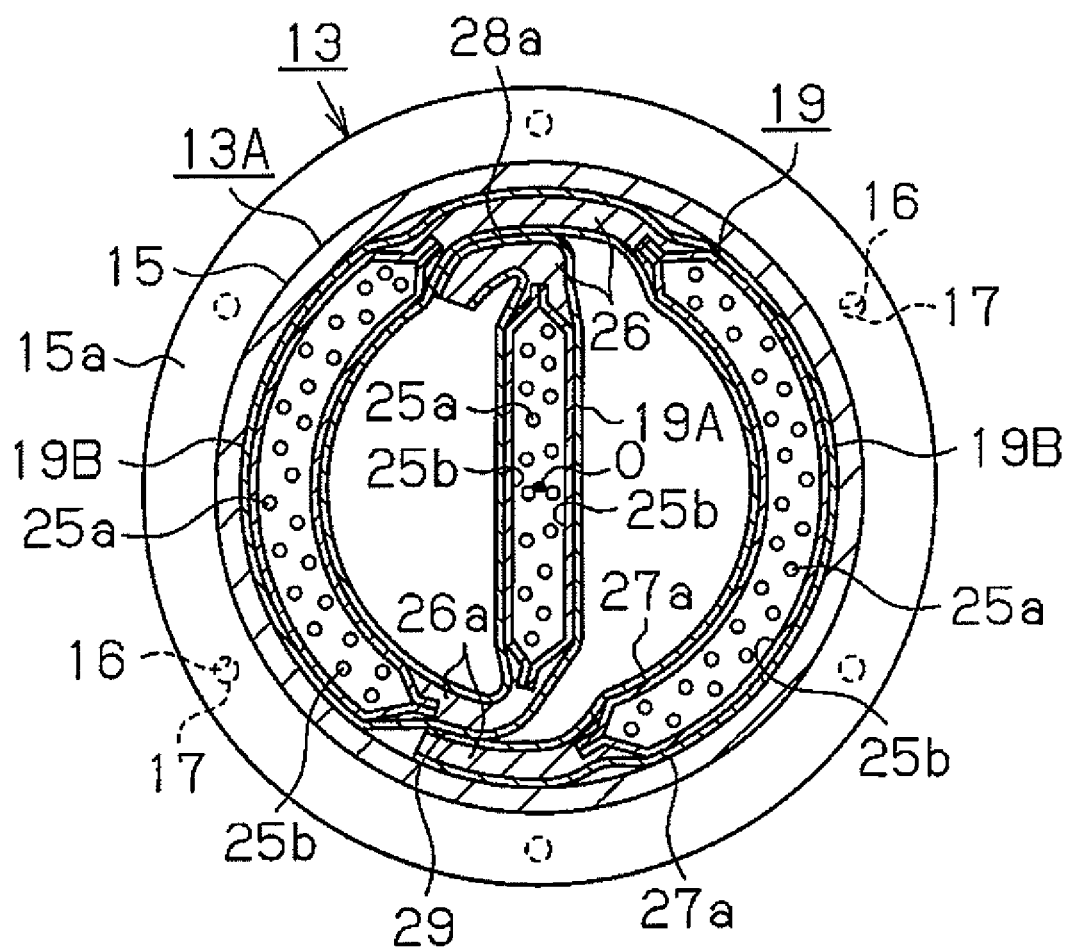
FIG. 12 is a longitudinal cross-sectional view illustrating a center portion of the air duct shown in FIG. 11.
Figure 13:
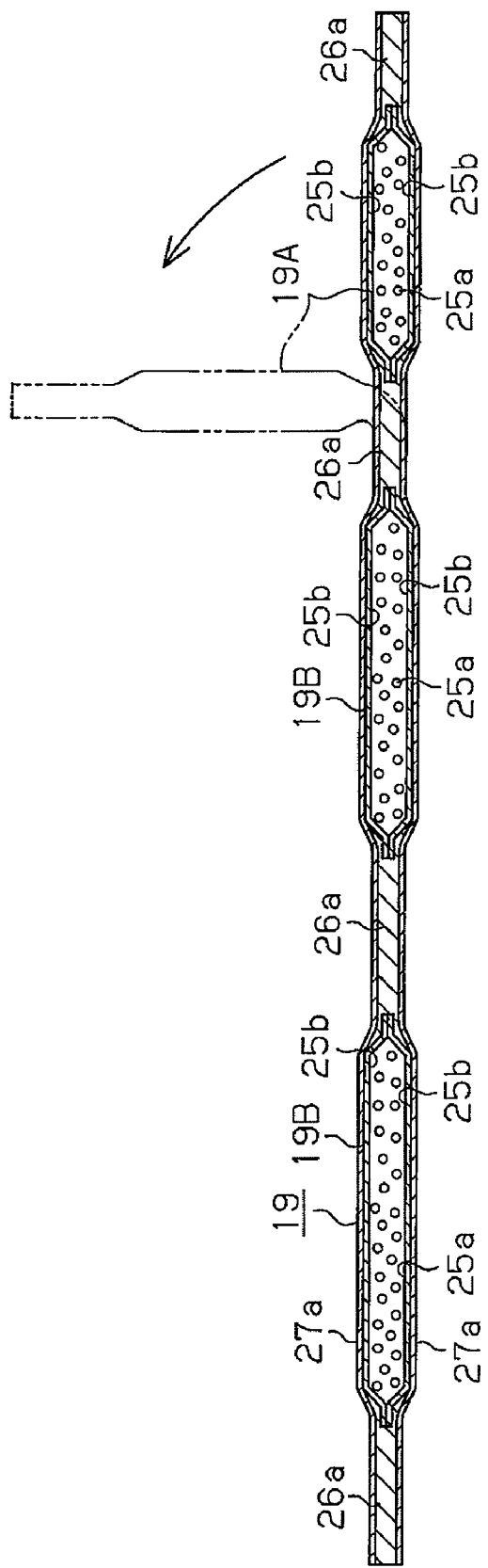
FIG. 13 is a cross-sectional development view illustrating a fuel adsorption filter of the air duct shown in FIG. 11.
Figure 14:
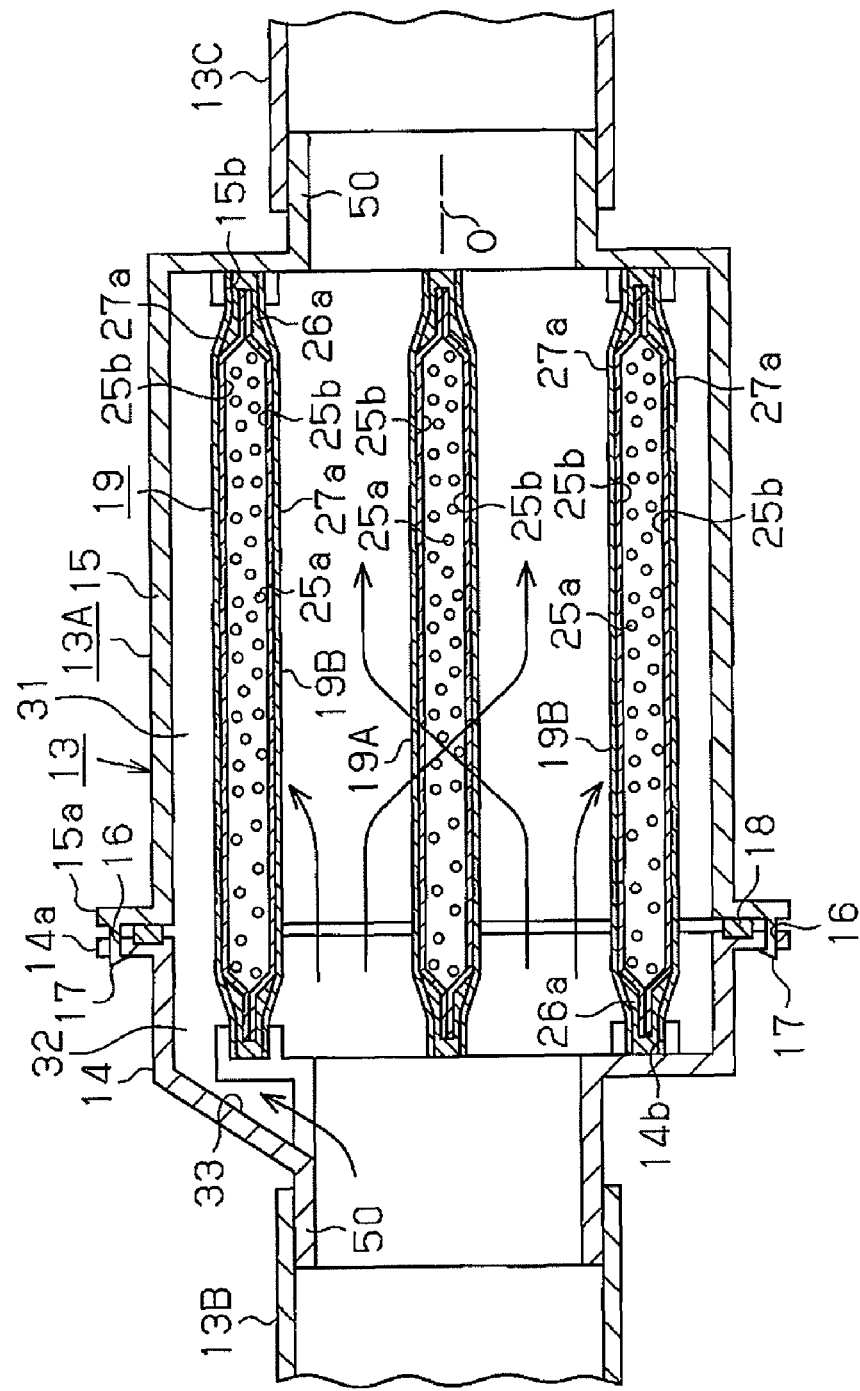
FIG. 14 is a cross-sectional view illustrating an air duct of an engine according to a ninth embodiment of the present invention.

In the eighth embodiment, as shown in FIGS. 11 to 13, the fuel adsorption filter 19 includes a first filter portion 19A, two filter portions 19B coupled to the first filter portion 19A, and coupler portions 26a, which couple the filter portions 19A, 19B to each other. Each of the filter portions 19A, 19B is formed like a sheet. Each coupler portion 26a is made of synthetic resin and is integrally formed with the ends and the outer peripheral edges of the filter portions 19A, 19B. Each coupler portion 26a is easily deformed. Each of the filter portions 19A, 19B includes a fuel adsorbent 25a and a pair of holding sheets 25b. The adsorbent 25a is granular activated carbon that adsorbs fuel vapor. The holding sheets 25b are made of nonwoven fabric and hold the adsorbent 25a substantially in an evenly dispersed manner. Outer surfaces of the filter portions 19A, 19B and the coupler portions 26a are covered with a pair of heat resistant nets 27a, which protect the adsorbent 25a from flames such as back fires and external forces.

When manufacturing the fuel adsorption filter 19, the entire filter 19 is first formed as a flat plate as a whole as shown in FIG. 13. Thereafter, the flat plate-like fuel adsorption filter 19 is rolled from one end, to be cylindrical. Specifically, as shown in FIG. 12, the first filter portion 19A is arranged in a plane passing through the axis O of a cylinder, that is, at the position of a chord, and the two second filter portions 19B are arranged along arcs of the cylinder. Before being installed in the duct main body 13A, the ends of the coupler portions 26a of the fuel adsorption filter 19 are welded or adhered to each other at a rolling start portion 28a and a rolling end portion 29a.

Annular holding grooves 14b, 15b are formed in an inner surfaces of the segments 14, 15 of the duct main body 13A, respectively. The coupler portions 26a at the ends of the cylindrically wound fuel adsorption filter 19 fitted into the holding grooves 14b, 15b, so that the fuel adsorption filter 19 is held between the segments 14, 15. In this state, the first filter portion 19A of the fuel adsorption filter 19 is located at the position of a chord in the duct main body 13A as shown in FIGS. 11 and 12, and the second filter portions 19B, 19B are arranged at the positions of arcs along the inner wall of the duct main body 13A. The inner diameters of the cylinders formed by the filter portions 19B on the inner circumferential surface of the duct main body 13A and the coupler portions 26a are greater than the minimum inner diameter of the coupler ducts 13B, 13C. Therefore, the pressure loss of air flow caused by the second filter portions 19B on the inner circumferential surface the coupler portions 26a is reduced.

In addition to the advantages of the seventh embodiment, the eighth embodiment has the following advantage.

When the engine 12 is not running, fuel vapor leaking from the engine 12 is efficiently adsorbed and trapped by the filter portions 19A, 19B, which are located at positions of chord and arcs in the duct main body 13A.

Ninth Embodiment

Figure 17C:
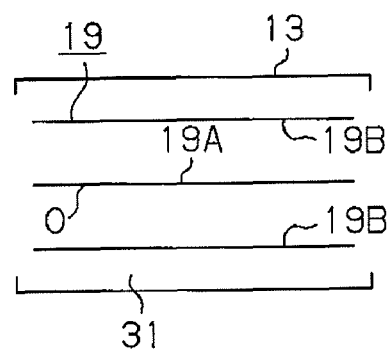
Figure 17D:
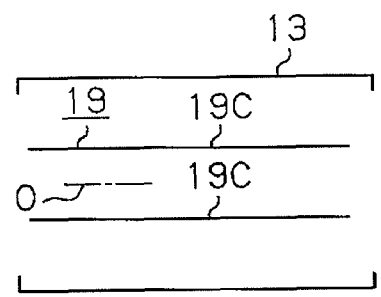
Figure 17E:
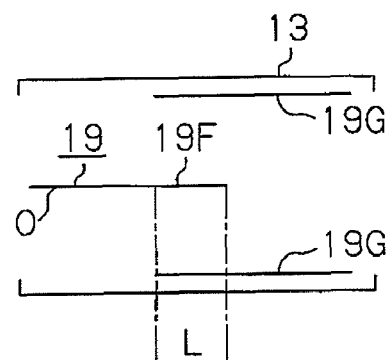
Figure 17F:
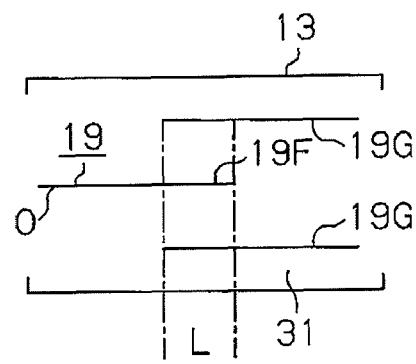

A ninth embodiment of the present invention, which corresponds to FIGS. 16(c) and 17(c), will now be described. The differences from the eighth embodiment will mainly be discussed.

In the ninth embodiment, a gap 31 is defined between the inner circumferential surface of the duct main body 13A and the outer circumferential surfaces of the filter portions 19B, 19B of the fuel adsorption filter 19. An opening 32 for drawing air flow into the gap 31 is formed between an air flow upstream area of the gap 31 and an air passage area of the duct main body 13A. An inclined guiding portion 33 is formed on an inner wall of the first segment 14 of the duct main body 13A. The inclined guiding portion 23 guides air flow to the opening 32.

Therefore, in the ninth embodiment, while the engine 12 is running, some of the air flow through the air passage area of the duct main body 13A is drawn to the gap 31 from the inclined guiding portion 33 through the opening 32. Thereafter, the air flow in the gap 31 passes through the filter portions 19B, 19B of the fuel adsorption filter 19 from the outside to the inside and is returned to the air passage area in the duct main body 13A. The ninth embodiment thus provides the following advantages.

Air flow that passes through the filter portions 19B, 19B from the outside to the inside further efficiently desorbs fuel vapor that has been adsorbed and trapped by the filter portions 19B, 19B.

In the ninth embodiment, an opening like the opening 32 may be provided in an air flow downstream area in the gap 31. In this case, the opening connects the gap 31 to the air passage area between a pair of the filter portions 19B.

Tenth Embodiment

A tenth embodiment of the present invention will now be described. The differences from the seventh embodiment will mainly be discussed.

Figure 15:
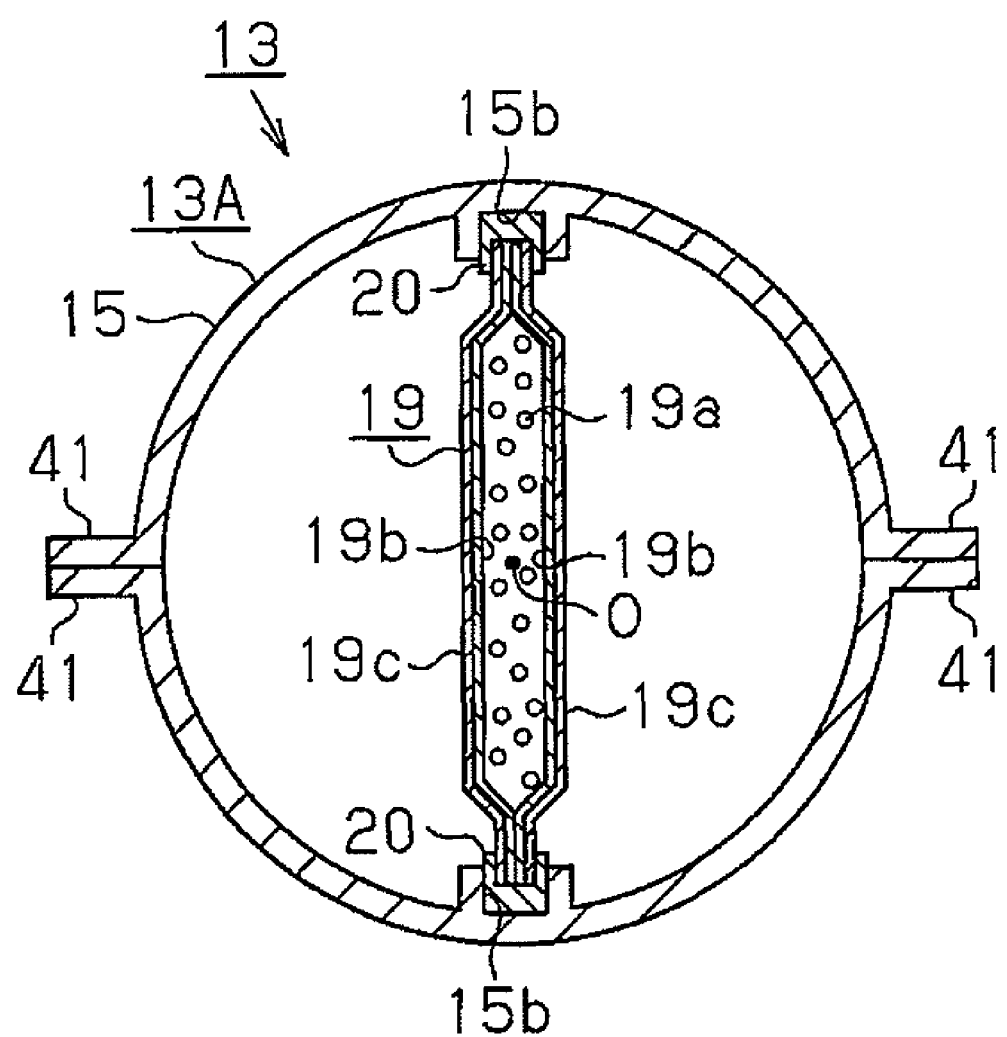
FIG. 15 is a cross-sectional view illustrating an air duct according to a tenth embodiment of the present invention.

In the tenth embodiment, the duct main body 13A is formed by a pair of segments 15, which are divided along a plane passing through the axis O of the duct main body 13A as shown in FIG. 15. Flanges 41 are formed at the edges of each segment 15. The segments 15 are bonded to each other by adhering the flanges 41. A holding groove 15b is formed in the inner surface of each segment 15. The annular frame 20 of the fuel adsorption filter 19 is fitted to the holding grooves 15b, so that the filter 19 is held by the segments 15. The filter 19 is thus located on a plane passing through the axis O of the duct main body 13A.

Therefore, the tenth embodiment is different from the seventh embodiment only in the structure of the duct main body 13A, and has similar advantages as the seventh embodiment.

Hereinafter, air ducts according to a third aspect of the present invention will be described.

Eleventh Embodiment

An eleventh embodiment of the present invention will now be described with reference to FIGS. 18 and 19.

Figure 18:
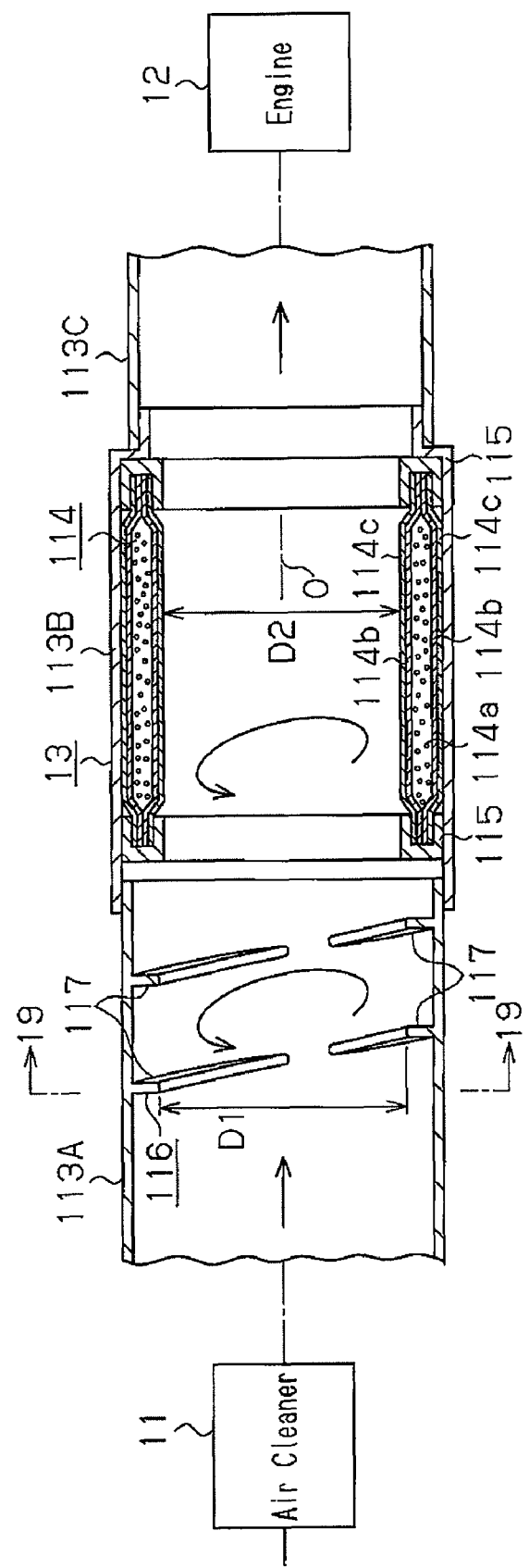
FIG. 18 is a cross-sectional view illustrating an air duct of an engine according to an eleventh embodiment of the present invention.

As shown in FIG. 18, an air duct 13 is located between an air cleaner 11 and an engine 12. The air duct 13 is formed by successively coupling a first duct 113A, a second duct 113B, and a third air duct 113C in the order from the air flow upstream side. While the engine 12 is running, air that has been filtered by the air cleaner 11 flows into the intake system of the engine 12 through the ducts 113A to 113C of the air duct 13.

A cylindrical fuel adsorption filter 114 is located in the intermediate second duct 113B to be coaxial with the second duct 113B. The fuel adsorption filter 114 includes a fuel adsorbent 114a, a pair of holding sheets 114b, and a pair of outer heat resistant net 114c. The adsorbent 114a is activated carbon that adsorbs fuel vapor. The holding sheets 114b are made of nonwoven fabric and hold the adsorbent 114a substantially in an evenly dispersed manner. The heat resistant nets 114c protect the holding sheets 114b and the holding sheets 114b from flames such as back fires and external forces. Synthetic resin annular frames 115 are fixed to the ends and peripheral edges of the holding sheets 114b and the heat resistant nets 114c. After the engine 12 is stopped, fuel vapor leaking from the intake system of the engine 12 is adsorbed and trapped by the adsorbent 114a of the fuel adsorption filter 114.

Figure 19:
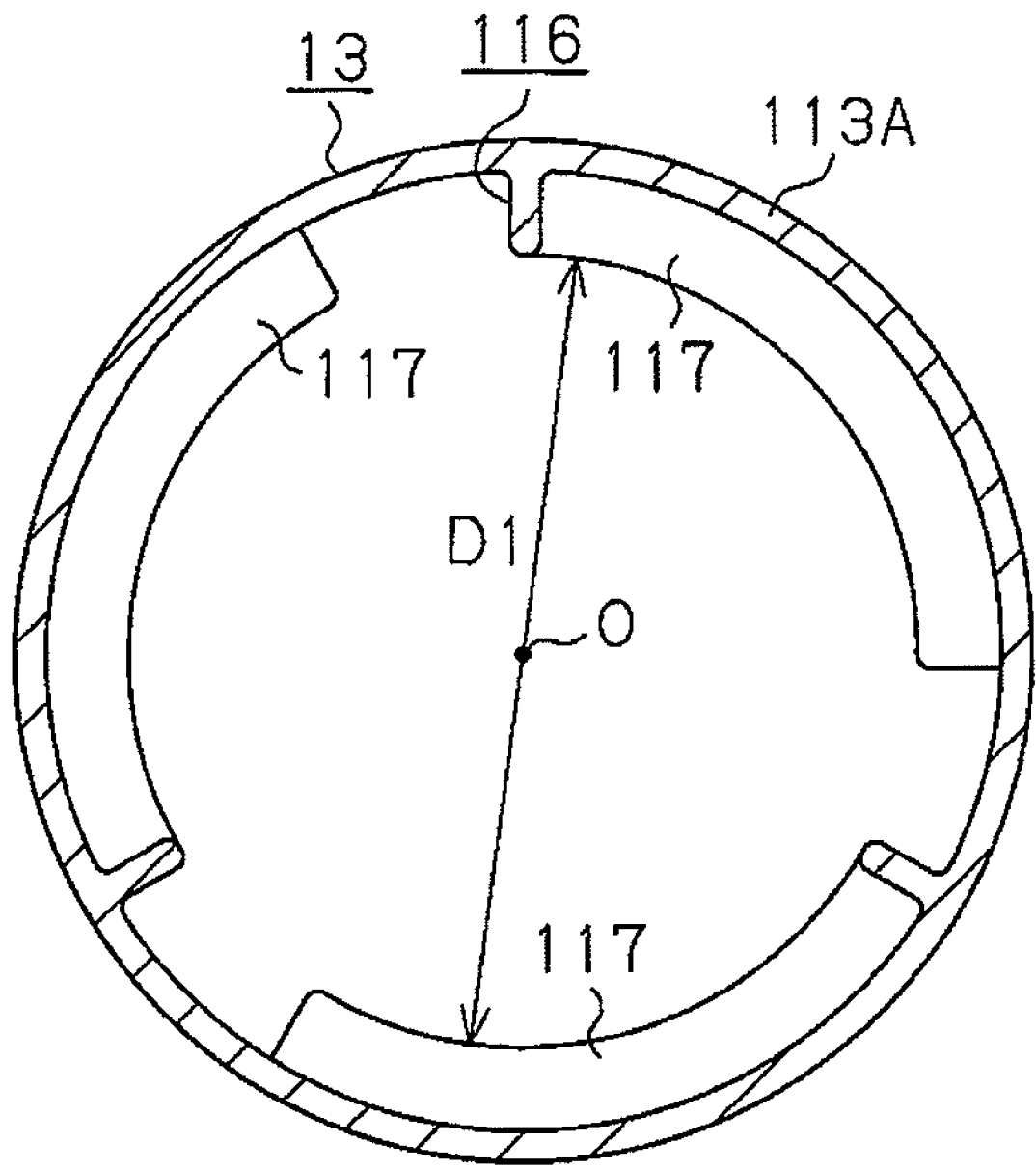
FIG. 19 is an enlarged cross-sectional view taken along line 19-19 of FIG. 18.

As shown in FIGS. 18 and 19, a helical flow generating mechanism 116, which generates helical flow, is located in the air duct 13 at a position upstream in air flow of the fuel adsorption filter 114. The helical flow generating mechanism 116 is formed by helical blades 117 projecting from the inner circumferential surface of the first duct 113A. Each blade 117 extends along the inner circumferential surface of the first duct 113A, and project radially inward. The inner diameter D1 of the inner circumferential surface defined by the blades 117 is greater than the inner diameter D2 of the fuel adsorption filter 114. When the engine 12 is running, the blades 117 of the helical flow generating mechanism 116 applies helical force to the air flow in the first duct 113A. As a result, the air flow helically advances in the air duct 13. Outer peripheral portion of the helical flow moves along the fuel adsorption filter 114 in the second duct 113B.

When the engine 12 of the vehicle having the air duct 13 is started, air flows into the intake system of the engine 12 through the air cleaner 11 and the air duct 13. Since the fuel adsorption filter 114 is arranged on the inner circumferential surface of the second duct 113B of the air duct 13, the pressure loss of the air flow is not increased.

After the engine 12 is stopped, fuel vapor that leaks from the intake system of the engine 12 is adsorbed and trapped by the adsorbent 114a of the fuel adsorption filter 114 arranged on the inner circumferential surface of the second duct 113B. Accordingly, fuel vapor is prevented from being discharged to the outside from the engine 12.

When the engine 12 is started again, the blades 117 of the helical flow generating mechanism 116 generate helical air flow in the first duct 113A. Outer peripheral portion of the helical flow moves along the fuel adsorption filter 114 in the second duct 113B. Therefore, air passes through the filter 114, and fuel vapor that has been adsorbed and trapped by the adsorbent 114a of the fuel adsorption filter 114 is easily desorbed from the adsorbent 114a.

The eleventh embodiment has the following advantages.

Helical flow generated by the blades 117 efficiently desorbs fuel vapor that has been adsorbed by the fuel adsorption filter 114. Therefore, fuel vapor that leaks during the stopped state of the engine 12 is effectively adsorbed and trapped.

The fuel adsorption filter 114 does not intersect air flow and is arranged on the inner circumferential surface of the second duct 113B of the air duct 13. This prevents the intake resistance of the engine 12 from being increased. As a result, the intake efficiency of the engine 12 is improved.

The inner diameter D1 of the inner circumferential surface defined by the blades 117 of the helical flow generating mechanism 116 is greater than the inner diameter D2 of the fuel adsorption filter 114. Accordingly, the blades 117 of the helical flow generating mechanism 116 generate a helical flow having a large radius. As a result, the desorption performance of the fuel adsorption filter 114 is improved. If the inner diameter D2 of the fuel adsorption filter 114 is sufficiently large, the blades 117 do not increase the intake resistance.

The blades 117 are formed integrally with the first duct 113A on the inner circumferential surface of the first duct 113A. The blades 117 therefore do not increase the number of the components of the air duct 13, and the structure of the air duct 13 is simple.

Twelfth Embodiment

A twelfth embodiment of the present invention will now be described. The differences from the eleventh embodiment will mainly be discussed.

Figure 20:
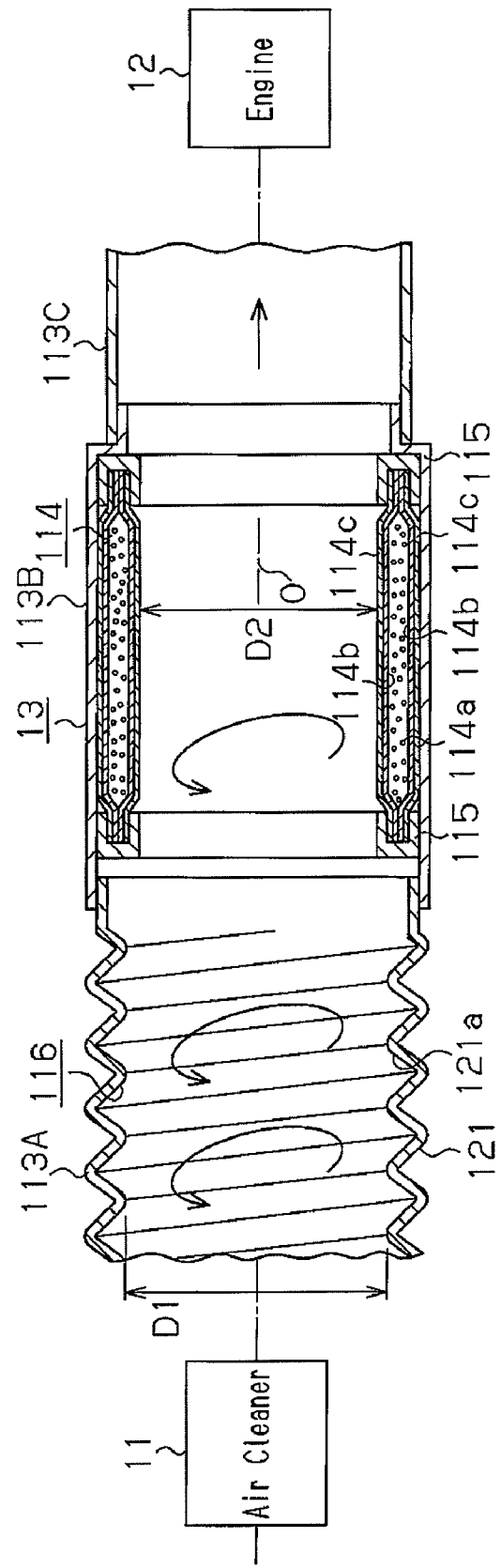
FIG. 20 is a cross-sectional view illustrating an air duct of an engine according to a twelfth embodiment of the present invention.

According to the twelfth embodiment, a first duct 113A of the air duct 13 is formed by a flexible hose 121. The flexible hose 121 is formed like a bellows as shown in FIG. 20. A helical V-shaped surface 121a formed on the inner circumferential surface of the flexible hose 121 forms a helical flow generating mechanism 116. When the engine 12 is running, the V-shaped surface 121a in the flexible hose 121 applies helical force to the air flow. This generates helical flow, which moves along the fuel adsorption filter 114.

Therefore, in addition to the same advantages as those of the eleventh embodiment, the twelfth embodiment provides the following advantage.

Since the first duct 113A is formed by the bellows-like flexible hose 121, the first duct 113A is easy to bend. The first duct 113A is thus efficiently arranged in bent spaces in the engine compartment.

Thirteenth Embodiment

A thirteenth embodiment of the present invention will now be described. The differences from the eleventh embodiment will mainly be discussed.

Figure 21:
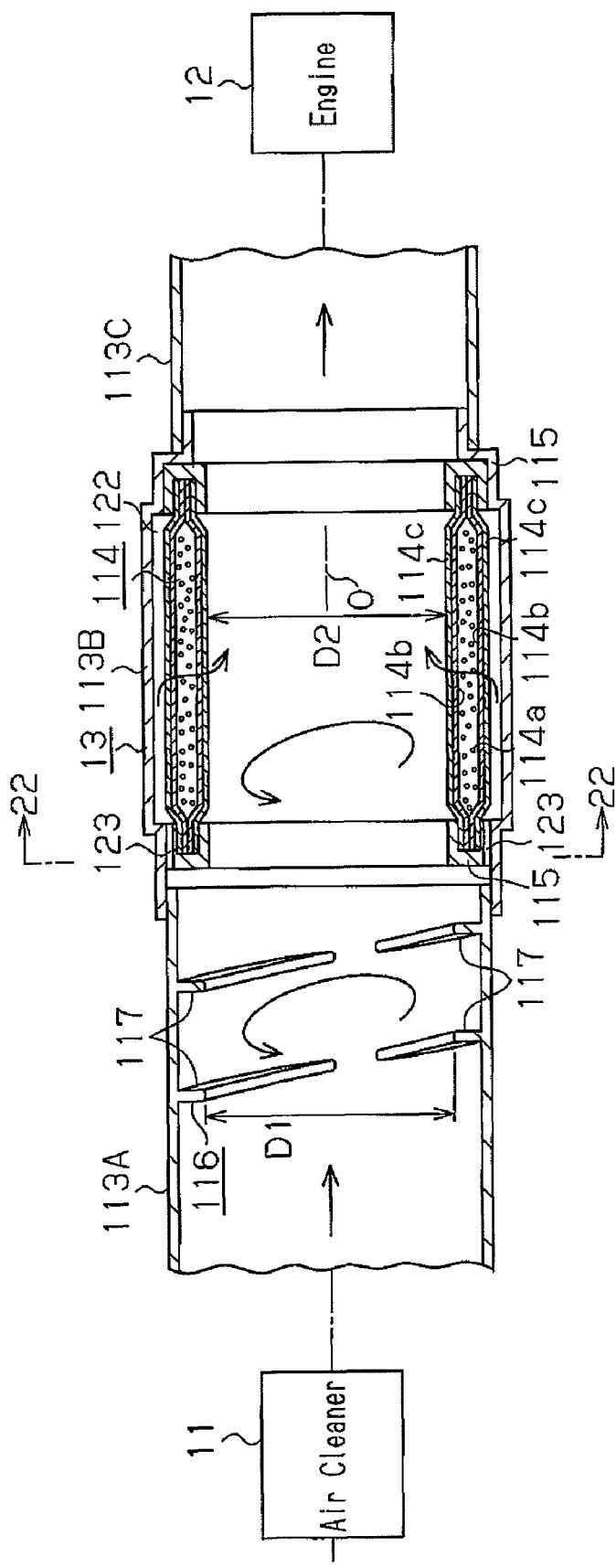
FIG. 21 is a cross-sectional view illustrating an air duct of an engine according to a thirteenth embodiment of the present invention.
Figure 22:
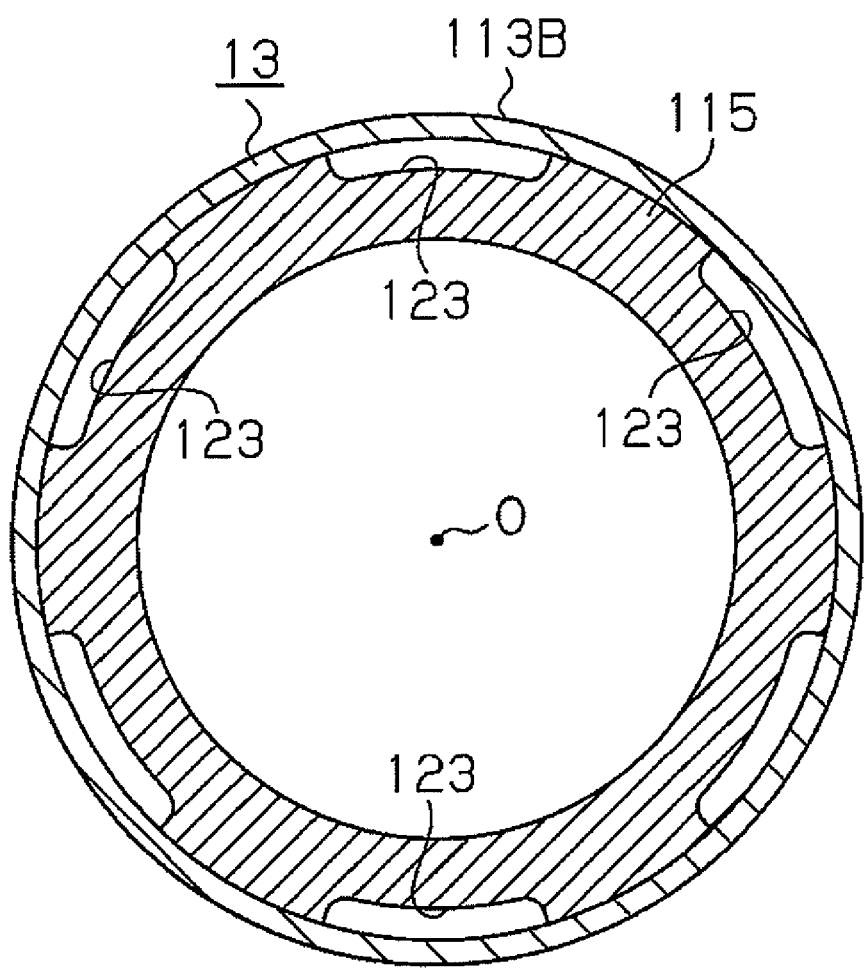
FIG. 22 is an enlarged cross-sectional view taken along line 22-22 of FIG. 21.

According to the thirteenth embodiment, a gap 122 is defined between the outer circumferential surface of a fuel adsorption filter 114 and the inner circumferential surface of a second duct 113B as shown in FIGS. 21 and 22. An annular frame 115 is located on an upstream side of the fuel adsorption filter 114 (front side of the fuel adsorption filter 114). A plurality of grooves 123 are formed on the outer circumference of the annular frame 115. The upstream portion of the gap 122 communicates with the air passage area in the air duct 13 through the grooves 123.

As in the case of the eleventh embodiment, blades 117 of a helical flow generating mechanism 116 apply helical force to air flow so that helical flow is generated in the first duct 113A in the thirteenth embodiment. In this case, the air flow upstream area in the gap 122 between the outer circumferential surface of the fuel adsorption filter 114 and the inner circumferential surface of the second duct 113B is open through the grooves 123. Thus, some of the helical air flow enters the gap 122 through the grooves 123 and then passes through the interior of the filter 114 to the inside, while desorbing fuel vapor.

The thirteenth embodiment thus has the following advantage.

The fuel vapor that has been adsorbed by the fuel adsorption filter 114 is desorbed also by air flow from the outside of the filter 114. This further improves the fuel vapor desorption performance of the adsorbent 114a of the fuel adsorption filter 114.

The thirteenth embodiment may be modified as follows.

In the thirteenth embodiment, the annular frame 115 on the downstream side of the fuel adsorption filter 114 may be replaced by the same annular frame as the annular frame 115 on the upstream side having the grooves 123 as shown in FIG. 22. Also, the gap 122 outside the fuel adsorption filter 114 may communicate with an air flow downstream area (an area of the rear end of the fuel adsorption filter 114). This configuration generates, in addition to air flow that passes through the fuel adsorption filter 114 from the outside to the inside, two additional air flows. The fuel vapor desorption performance is therefore further improved. The two additional air flows are as follows: an air flow that flows from the upstream grooves 123 to the downstream side of the filter 114 through the gap 122 and the downstream grooves; and an air flow that flows from the inside to the outside of the fuel adsorption filter 114 and then flows from the downstream grooves to the downstream side of the filter 114.

In the thirteenth embodiment, in addition to the grooves 123 formed in the upstream annular frame 115, annular grooves 123 may be formed in the downstream annular frame 115. Further, the gap 122 outside the fuel adsorption filter 114 may communicate only the air flow downstream area. This configuration generates an air flow that passes through the fuel adsorption filter 114 from the inside to the outside, and then flows out of the annular frame 115 through the grooves. This structure also improves the fuel vapor desorption performance.

In the thirteenth embodiment, instead of the blades 117, the helical flow generating mechanism 116 may be formed by the flexible hose 121 according to the twelfth embodiment.

In the eleventh to thirteenth embodiments, a cylindrical body is used as the fuel adsorption filter 114. However, a plurality of semi-cylindrical fuel adsorption filters that extend along the axis O of the second duct 113B may be used. In this case, the semi-cylindrical fuel adsorption filters are arranged along the inner circumferential surface of the second duct 113B along the circumferential direction.

The above described embodiments may be modified as follows.

As the fuel adsorption filter, a sheet that is formed by binding granular or powder activated carbon with binder may be used. According to this configuration, the fuel adsorption filter has a shape retaining feature, and requires no annular frame to be provided at the peripheral portion.

As the fuel adsorbent, a type other than granular or powder activated carbon may be used. For example, activated carbon fiber and granular or plate-like porous ceramic may be used.

Therefore, the present examples and embodiments are to be considered as illustrative and not restrictive and the invention is not to be limited to the details given herein, but may be modified within the scope and equivalence of the appended claims.

What is claimed is:

1. An air duct for an engine, the air duct being connected between an intake system of the engine and an air cleaner,
   wherein the air duct is hollow and has an inner circumferential surface, wherein, when the engine is operating, an air flow from the air cleaner toward the engine is generated in the air duct,
   wherein the air duct comprises a cylindrical fuel adsorption filter that has an outer circumferential surface and air permeability,
   wherein the fuel adsorption filter is arranged in the air duct to be coaxial with respect to an axis of the air duct, such that a gap is defined between the inner circumferential surface of the air duct and the outer circumferential surface of the fuel adsorption filter, and
   wherein an upstream communication passage for drawing some of the air flow into the gap is formed between an air flow upstream area of the gap and the air flow.

2. The air duct according to claim 1, further comprising an air passage area in its center portion, wherein an opening for drawing some of the air flow into the gap is formed between the air flow upstream area of the gap and the air passage area.

3. The air duct according to claim 2, wherein a downstream communication passage connecting an air flow downstream area and the air passage area to each other is formed between the air flow downstream area of the gap and the air passage area.

4. The air duct according to claim 2, wherein a downstream communication passage for drawing some of the air flow into the gap is formed between the air flow downstream area of the gap and the air passage area.

5. The air duct according to claim 4, further comprising a cylindrical portion formed in a downstream portion of the air duct, the cylindrical portion supporting the fuel adsorption filter and guiding the air flow, wherein at least one through hole communicating with the downstream communication passage is formed in the cylindrical portion.

6. The air duct according to claim 1, further comprising a cylindrical portion for guiding the air flow, wherein the inner diameter of the fuel adsorption filter is greater than or equal to the inner diameter of the cylindrical portion.

7. The air duct according to claim 1, further comprising a guide for guiding air flow to the upstream communication passage.

8. The air duct according to claim 1, further comprising a cylindrical portion formed in an upstream portion of the air duct, the cylindrical portion supporting the fuel adsorption filter and guiding the air flow, wherein at least one through hole communicating with the upstream communication passage is formed in the cylindrical portion.

9. The air duct according to claim 1, wherein a portion of the air duct that corresponds to the fuel adsorption filter has a polygonal cross-sectional shape, and wherein the gap is defined between the inner circumferential surface of the polygonal portion and the outer circumferential surface of the fuel adsorption filter.

10. An air duct for an engine, the air duct being connected between an intake system of the engine and an air cleaner,
   wherein the air duct is a hollow cylinder having an axis,
   wherein the air duct comprises a sheet-like fuel adsorption filter located therein, wherein at least a portion of the fuel adsorption filter is arranged on a plane that is parallel to the axis of the air duct, so as to form a chord in relation to the cylindrical shape of the air duct, wherein the fuel adsorption filter is configured by a plurality of filter portions including a first filter portion that forms a first chord in the air duct and a second filter portion that forms a second chord in the air duct, and wherein each of the plurality of filter portions includes at least one coupling end with the plurality of filter portions being coupled to each other at the coupling end by a deformable coupler portion.

11. The air duct according to claim 10, wherein the fuel adsorption filter has air permeability.

12. The air duct according to claim 10, wherein the air duct is configured by a pair of segments, and the fuel adsorption filter is held between the segments.

13. An air duct for an engine, the air duct being connected between an air cleaner and an intake system of the engine, wherein the air duct is a hollow cylinder having an inner circumferential surface, wherein, when the engine is operating, an air flow from the air cleaner toward the engine is generated in the air duct, wherein the air duct comprises a cylindrical fuel adsorption filter extending along the inner circumferential surface of the air duct, wherein the air duct includes a helical flow generator for causing the air flow to advance helically, the helical flow generator being located in the air duct at a position upstream of the fuel adsorption filter, wherein at least a portion of the fuel adsorption filter is spaced from the air duct for defining a gap between an outer circumferential surface of the portion of the fuel adsorption filter and the inner circumferential surface of the air duct, and wherein an adsorbing surface of the fuel adsorption filter extends along the gap.

14. The air duct according to claim 13, wherein the helical flow generator is formed on the inner circumferential surface of the air duct, and configured by a plurality of helically arranged blades.

15. The air duct according to claim 14, wherein the diameter of a circle defined by the blades is greater than an inner diameter of the fuel adsorption filter.

16. The air duct according to claim 13, wherein the helical flow generator is configured by a hose having a V-shaped groove which is helically and continuously formed.

17. The air duct according to claim 16, wherein an inner diameter of the hose is greater than an inner diameter of the fuel adsorption filter.

18. The air duct according to claim 13, wherein the fuel adsorption filter is formed by a fiber sheet holding granular activated carbon.

19. An air duct for an engine, the air duct being connected between an air cleaner and an intake system of the engine, wherein the air duct is a hollow cylinder having an inner circumferential surface, wherein, when the engine is operating, an air flow from the air cleaner toward the engine is generated in the air duct, wherein the air duct comprises a cylindrical fuel adsorption filter located on the inner circumferential surface of the air duct, wherein the air duct includes a helical flow generator for causing the air flow to advance helically, the helical flow generator being located in the air duct at a position upstream of the fuel adsorption filter, wherein the fuel adsorption filter is arranged in such a manner that a gap is defined between the outer circumferential surface of the fuel adsorption filter and the inner circumferential surface of the air duct, and wherein the fuel adsorption filter has an end on the air flow upstream side, the air flow upstream side end being supported by a first annular frame, wherein an upstream groove is formed on an outer circumference of the first annular frame, and wherein an air flow upstream area of the gap communicates with the air flow through the upstream groove of the first annular frame.

20. An air duct for an engine, the air duct being connected between an air cleaner and an intake system of the engine, wherein the air duct is a hollow cylinder having an inner circumferential surface, wherein, when the engine is operating, an air flow from the air cleaner toward the engine is generated in the air duct, wherein the air duct comprises a cylindrical fuel adsorption filter located on the inner circumferential surface of the air duct, wherein the air duct includes a helical flow generator for causing the air flow to advance helically, the helical flow generator being located in the air duct at a position upstream of the fuel adsorption filter, wherein the fuel adsorption filter is arranged in such a manner that a gap is defined between the outer circumferential surface of the fuel adsorption filter and the inner circumferential surface of the air duct, and wherein the fuel adsorption filter has an end on an air flow downstream side, the air flow downstream side end being supported by a second annular frame, wherein an downstream groove is formed on an outer circumference of the second annular frame, and wherein an air flow downstream area of the gap communicates with the air flow through the downstream groove of the second annular frame.

* * * * *